(12) United States Patent
Miwa et al.

(10) Patent No.: US 9,903,009 B2
(45) Date of Patent: Feb. 27, 2018

(54) RARE EARTH MAGNET AND METHOD FOR MANUFACTURING SAME

(75) Inventors: Masashi Miwa, Tokyo (JP); Takeshi Sakamoto, Tokyo (JP); Jun Hagiwara, Tokyo (JP); Masami Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 120 days.

(21) Appl. No.: 13/352,172

(22) Filed: Jan. 17, 2012

(65) Prior Publication Data

US 2012/0112862 A1    May 10, 2012

Related U.S. Application Data

(62) Division of application No. 10/594,338, filed as application No. PCT/JP2005/006404 on Mar. 31, 2005, now abandoned.

(30) Foreign Application Priority Data

Mar. 31, 2004  (JP) .................................. 2004-103913
Jun. 4, 2004   (JP) .................................. 2004-167693
(Continued)

(51) Int. Cl.
  *C22C 33/02*   (2006.01)
  *H01F 41/02*   (2006.01)
  (Continued)

(52) U.S. Cl.
  CPC ............ *C22C 33/0278* (2013.01); *C09D 5/08* (2013.01); *C23C 22/18* (2013.01); *C23C 22/42* (2013.01);
  (Continued)

(58) Field of Classification Search
  CPC . Y10T 428/32; Y10T 428/325; Y10T 428/26; Y10T 428/31678; B22F 2999/00;
  (Continued)

(56) References Cited

U.S. PATENT DOCUMENTS 4,802,931 A     2/1989  Croat
4,837,114 A *   6/1989  Hamada ................ H01F 1/0572
                                                148/302
(Continued)

FOREIGN PATENT DOCUMENTS

CN    1259754 A     7/2000
EP    0 466 988 A2  1/1992
(Continued)

OTHER PUBLICATIONS

Jun. 5, 2009 Office Action issued in Chinese Patent Application No. 2005800107722.
(Continued)

*Primary Examiner* — Holly Rickman
*Assistant Examiner* — Lisa Chau
(74) *Attorney, Agent, or Firm* — Oliff PLC

(57) ABSTRACT

A rare-earth element including a magnet body containing a rare-earth element, and a protective layer formed on a surface of the magnet body. The protective layer may include a first layer covering the magnet body and containing a rare-earth element, and a second layer covering the first layer and containing substantially no rare-earth element. Another protective layer in accordance may include an inner protective layer and an outer protective layer successively from the magnet body side. The outer protective layer is any of an oxide layer, a resin layer, a metal salt layer, and a layer containing an organic-inorganic hybrid compound.

8 Claims, 18 Drawing Sheets

(30) Foreign Application Priority Data

| Dec. 27, 2004 | (JP) | 2004-377336 |
|---|---|---|
| Feb. 28, 2005 | (JP) | 2005-055011 |
| Mar. 31, 2005 | (JP) | 2005-101835 |
| Mar. 31, 2005 | (JP) | 2005-102487 |

(51) Int. Cl.

| *H01F 1/057* | (2006.01) |
|---|---|
| *C09D 5/08* | (2006.01) |
| *C23C 22/18* | (2006.01) |
| *C23C 22/42* | (2006.01) |
| *C23C 22/73* | (2006.01) |
| *C23C 22/74* | (2006.01) |
| *B22F 3/24* | (2006.01) |
| *B22F 9/04* | (2006.01) |

(52) U.S. Cl.
CPC .............. *C23C 22/73* (2013.01); *C23C 22/74* (2013.01); *H01F 1/0572* (2013.01); *H01F 41/026* (2013.01); *B22F 2003/248* (2013.01); *B22F 2009/041* (2013.01); *B22F 2009/043* (2013.01); *B22F 2009/044* (2013.01); *B22F 2998/10* (2013.01); *B22F 2999/00* (2013.01); *H01F 1/0577* (2013.01); *Y10T 428/26* (2015.01); *Y10T 428/31678* (2015.04)

(58) Field of Classification Search
CPC ...... B22F 3/02; B22F 3/10; B22F 3/24; B22F 2998/10; B22F 2201/10; B22F 2201/20; B22F 2202/05; B22F 9/04; B22F 2003/248; B22F 2009/041; B22F 2009/043; B22F 2009/044; C22C 33/0278; C23C 22/18; C23C 22/42; C23C 22/73; C23C 22/74; H01F 1/0577; H01F 41/026

See application file for complete search history.

(56) References Cited

U.S. PATENT DOCUMENTS

| 5,282,904 | A | | 2/1994 | Kim et al. | |
|---|---|---|---|---|---|
| 5,876,518 | A | * | 3/1999 | Hasegawa et al. | 148/302 |
| 6,326,087 | B1 | * | 12/2001 | Nishiuchi | H01F 41/026 428/469 |
| 2002/0007875 | A1 | | 1/2002 | Yamamoto et al. | |
| 2002/0036031 | A1 | * | 3/2002 | Sakaki | H01F 1/0557 148/301 |

FOREIGN PATENT DOCUMENTS

| JP | A 59-046008 | | 3/1984 |
|---|---|---|---|
| JP | A 60-9852 | | 1/1985 |
| JP | A 60-054406 | | 3/1985 |
| JP | A 60-063901 | | 4/1985 |
| JP | A 60-063902 | | 4/1985 |
| JP | A 61-130453 | | 6/1986 |
| JP | A-63-062204 | | 3/1988 |
| JP | A 63-217601 | | 9/1988 |
| JP | 03-024044 | | 4/1991 |
| JP | 04328804 A | * | 11/1992 |
| JP | A 4-328804 | | 11/1992 |
| JP | A 4-335501 | | 11/1992 |
| JP | A 52-26129 | | 9/1993 |
| JP | A 60-69011 | | 3/1994 |
| JP | A 9-045567 | | 2/1997 |
| JP | A-10-060235 | | 3/1998 |
| JP | A-2000-044583 | | 2/2000 |
| JP | A-2001-35509 | | 2/2001 |
| JP | A 2001-076914 | | 3/2001 |
| JP | A-2001-0172782 | | 6/2001 |
| JP | A 2001-176711 | | 6/2001 |
| JP | A 2001-230108 | | 8/2001 |
| JP | A-2002-025812 | | 1/2002 |
| JP | A-2002-0105655 | | 4/2002 |
| JP | A-2002-222691 | | 8/2002 |
| JP | A-2003-064454 | | 3/2003 |
| JP | A 2003-086413 | | 3/2003 |
| JP | 2003197412 A | * | 7/2003 |
| JP | A-2003-261826 | | 9/2003 |
| JP | A 2005-285793 | | 10/2005 |
| JP | A 2005-286031 | | 10/2005 |
| JP | B-3911514 | | 5/2007 |
| JP | B-4029095 | | 1/2008 |
| JP | B2-4073881 | | 4/2008 |
| WO | WO 99/02337 A1 | | 1/1999 |
| WO | WO 9902337 A1 | * | 1/1999 |
| WO | WO 03/095560 A1 | | 11/2003 |

OTHER PUBLICATIONS

May 4, 2010 Supplementary Search Report issued in European Patent Application No. 05728033.1.

Oct. 29, 2014 European Office Action issued in European Application No. 05 728 033.1.

* cited by examiner

RARE EARTH MAGNET AND METHOD FOR MANUFACTURING SAME

This is a Divisional of application Ser. No. 10/594,338 filed Nov. 14, 2006, which is a National Phase application of PCT/JP2005/006404 filed Mar. 31, 2005, and which claims the benefit of Japanese Application Nos. 2004-103913 filed Mar. 31, 2004, 2004-167693 filed Jun. 4, 2004, 2004-377336 filed Dec. 27, 2004, 2005-055011 filed Feb. 28, 2005, 2005-101835 filed Mar. 31, 2005, and 2005-102487 filed Mar. 31, 2005. The disclosures of the prior applications are hereby incorporated by reference herein in their entirety.

TECHNICAL FIELD

The present invention relates to a rare-earth magnet, a rare-earth magnet having a surface formed with a protective layer in particular, and a method of manufacturing the same.

BACKGROUND ART

As permanent magnets exhibiting a high energy product of 25 MGOe or greater, so-called rare-earth magnets (R—Fe—B magnets, where R is a rare-earth element such as neodymium as in the following) have been developed. As such rare-earth magnets, for example, Patent Documents 1 and 2 disclose one formed by sintering and one formed by rapid cooling, respectively.

Though the rare-earth magnets exhibit a high energy product, their corrosion resistance is relatively low since they contain a rare-earth element and iron which are relatively easy to oxidize as main ingredients.

For ameliorating the corrosion resistance of such rare-earth magnets, it has been proposed to form a protective layer. Among them, Patent Document 3 proposes to form a protective layer by heating a rare-earth magnet at 200 to 500° C. in an oxidizing atmosphere.

Patent Document 1: Japanese Patent Application Laid-Open No. SHO 59-46008
Patent Document 2: Japanese Patent Application Laid-Open No. SHO 60-9852
Patent Document 3: Japanese Patent Application Laid-Open No. HEI 5-226129

DISCLOSURE OF THE INVENTION

Problem to be Solved by the Invention

Though the above-mentioned Patent Document 3 proposes to form a protective layer at a specific temperature in an oxidizing atmosphere, there have been many cases where even such a method cannot satisfactorily form a protective layer which can sufficiently prevent rare-earth magnets from corroding. Therefore, thus obtained rare-earth magnets have still been hard to fully prevent powdering and weight loss from occurring in corrosion tests.

In view of such circumstances, it is an object of the present invention to provide a rare-earth magnet having a sufficient corrosion resistance, and a method of manufacturing the same.

Means for Solving Problem

The inventors conducted diligent studies in order to achieve the above-mentioned object and, as a result, have found that a corrosion resistance superior to that conventionally available is obtained when a plurality of layers different from each other in terms of composition or constituent material are formed on a surface of a magnet body, thereby completing the present invention.

Namely, the rare-earth magnet of the present invention comprises a magnet body containing a rare-earth element, and a protective layer formed on a surface of the magnet body; the protective layer having a first layer covering the magnet body and containing a rare-earth element, and a second layer covering the first layer and containing substantially no rare-earth element.

The inventors presume that the following is a reason why the rare-earth magnet having the structure mentioned above has a sufficient corrosion resistance. A rare-earth magnet contains a rare-earth element as its constituent element. This rare-earth element is very easy to oxidize and is likely to be eluted into acidic solutions. In the rare-earth magnet of the present invention, by contrast, the protective layer has a first layer covering the magnet body and containing a rare-earth element, and a second layer covering the first layer and containing substantially no rare-earth element. It seems that, since a surface of the rare-earth magnet is thus covered with the second layer containing substantially no rare-earth element, the stability of the protective layer improves, thereby ameliorating the corrosion resistance. It also seems that thus configured protective layer becomes dense in structure, thereby improving the stability of the protective layer and ameliorating the corrosion resistance.

Preferably, in the rare-earth magnet of the present invention, the protective layer is formed by heat-treating the magnet body in an oxidizing atmosphere containing an oxidizing gas while adjusting at least one condition of a partial pressure of the oxidizing gas, a treatment temperature, and a treatment time such as to have the first layer covering the magnet body and containing a rare-earth element, and the second layer covering the first layer and containing substantially no rare-earth element.

The rare-earth magnet of the present invention may comprise a magnet body containing a rare-earth element, and a protective layer formed on a surface of the magnet body; the protective layer having a first layer covering the magnet body and containing a rare-earth element, and a second layer covering the first layer and containing a rare-earth element by an amount smaller than that in the first layer.

The inventors presume that the following is a reason why the rare-earth magnet having the structure mentioned above has a sufficient corrosion resistance. A rare-earth magnet contains a rare-earth element as its constituent element. This rare-earth element is very easy to oxidize and is likely to be eluted into acidic solutions. In the rare-earth magnet obtained by the manufacturing method of the present invention, by contrast, the protective layer has a first layer covering the magnet body and containing a rare-earth element, and a second layer covering the first layer and containing a rare-earth element by an amount smaller than that in the first layer. It seems that, since a surface of the rare-earth magnet is covered with the second layer containing a rare-earth element by an amount smaller than that in the first layer, the stability of the protective layer improves, thereby ameliorating the corrosion resistance. It also seems that the protective layer having the specific structure mentioned above becomes dense in structure, thereby improving the stability of the protective layer and ameliorating the corrosion resistance.

It will also be preferred in such a rare-earth magnet if the protective layer is formed by heat-treating the magnet body in an oxidizing atmosphere containing an oxidizing gas while adjusting at least one condition of a partial pressure of the oxidizing gas, a treatment temperature, and a treatment time such as to have the first layer covering the magnet body and containing a rare-earth element, and the second layer covering the first layer and containing a rare-earth element by an amount smaller than that in the first layer.

Preferably, in the rare-earth magnet of the present invention, the protective layer contains oxygen and an element derived from the magnet body. This makes the protective layer extremely excellent in adhesion to the magnet body, thereby further improving the corrosion resistance of the rare-earth magnet. Such a rare-earth magnet of the present invention has a sufficiently high corrosion resistance, a uniform protective layer thickness, and an excellent dimensional precision. Also, since the specific protective layer is formed, this rare-earth magnet is kept from deteriorating its performances at the time of manufacture and use, and has an excellent reliability.

Specifically, it will be preferred if the magnet body contains a rare-earth element and a transition element other than the rare-earth element, the first layer contains the rare-earth element, the transition element, and oxygen, and the second layer contains the transition element and oxygen.

Namely, it will be preferred if the rare-earth element in the first layer, the transition element in the first layer, and the transition element in the second layer are elements derived from the magnet body. In particular, it will be more preferred if the rare-earth element in the first layer, the transition element in the first layer, and the transition element in the second layer are elements constructing a main phase of the magnet body.

More preferably, in the protective layer, the rare-earth element is neodymium. Further, iron and/or cobalt is preferred as the transition element other than the rare-earth element.

More preferably, in the rare-earth magnet of the present invention, the first and second layers have a total thickness of 0.1 to 20 μm.

The rare-earth magnet of the present invention may comprise a magnet body containing a rare-earth element, and a protective layer formed on a surface of the magnet body; the protective layer having an inner protective layer containing a rare-earth element and/or a transition element and oxygen, and an outer protective layer made of a constituent material different from that of the inner protective layer.

In recent years, the use of rare-earth magnets as magnets for motors in hybrid cars have been under consideration. In this case, the rare-earth magnets are used near engines and are exposed to a high temperature exceeding 150° C. However, conventional rare-earth magnets have been likely to deteriorate by corrosion in such a high-temperature environment, and their protective layers have been insufficient in terms of heat resistance.

By contrast, the rare-earth magnet of the present invention comprises two protective layers, i.e., inner and outer protective layers having respective constituent materials different from each other, and thus is equipped with not only superior corrosion resistance but also superior heat resistance, as compared with a conventional rare-earth magnet formed with a single protective layer.

More preferably, the inner protective layer in the rare-earth magnet of the present invention has a first layer covering the magnet body and containing a rare-earth element, and a second layer covering the first layer and containing substantially no rare-earth element.

In the inner protective layer having this structure, the first layer adjacent to the magnet body contains a rare-earth element and thus exhibits an excellent adhesion to the magnet body. The second layer formed on the outer side contains substantially no rare-earth element, and thus is very hard to oxidize. Therefore, the rare-earth magnet comprising such first and second layers can exhibit a superior corrosion resistance as compared with one not provided with these two protective layers.

The inner protective layer may have a first layer covering the magnet body and containing a rare-earth element, and a second layer covering the first layer and containing a rare-earth element by an amount smaller than that in the first layer. Such a second layer is also very hard to oxidize. Therefore, the rare-earth magnet comprising such first and second layers can exhibit a superior corrosion resistance as compared with one not provided with these two protective layers.

More specifically, it will be preferred if the magnet body contains a rare-earth element and a transition element other than the rare-earth element, the first layer contains the rare-earth element, the transition element, and oxygen, and the second layer contains the transition element and oxygen. In this case, the first layer contains the same rare-earth element as with the magnet body, and the second layer contains the same transition element as with the first layer, whereby the adhesion of each layer can become more favorable. As a result, the corrosion resistance of the rare-earth magnet further improves.

In particular, it will be further preferred if the rare-earth element in the first layer, the transition element in the first layer, and the transition element in the second layer are elements derived from the magnet body. Namely, it will be preferred if the first and second layers are formed by changing the magnet body by a reaction or the like. This structure makes the adhesion of each layer more favorable and allows each layer to become a very dense film. As a result, the corrosion resistance of the rare-earth magnet becomes further favorable.

Preferably, in the rare-earth magnet of the present invention, the outer protective layer is an oxide layer having a composition different from that of the inner protective layer. When an oxide layer having a composition different from that of the inner protective layer is thus provided on the outside of the inner protective layer, the rare-earth magnet becomes extremely excellent in not only corrosion resistance but also heat resistance. Such an effect becomes further superior in particular when the oxide layer contains an oxide of a metal element different from a metal element contained in the first and second layers.

More preferably, the oxide layer is an amorphous layer. The outer protective layer microscopically has no grain boundary. Usually, in crystalline substances, grain boundary parts deteriorate, thereby causing dropouts of particles and the like, which may become a cause of corrosion. When the oxide layer as the outer protective layer is made amorphous as mentioned above, however, the corrosion can effectively be restrained from being caused as such.

More preferably, the oxide layer has a layer made of a p-type oxide semiconductor, and a layer made of an n-type oxide semiconductor formed on the outer side thereof. It has been presumed that corrosion of a rare-earth magnet occurs when a rare-earth element is oxidized, i.e., the rare-earth element is deprived of an electron. Therefore, when a layer made of a p-type semiconductor oxide and a layer made of an n-type semiconductor oxide are thus formed successively from the magnet body side, a rectifying action caused by such coupling inhibits electrons from flowing in the direction mentioned above. As a result, the corrosion resistance of the rare-earth magnet further improves.

More preferably, it will be preferred if the outer protective layer is an oxide layer containing an oxide of at least one species of element selected from the group consisting of Al, Ta, Zr, Hf, Nb, P, Si, Ti, Mg, Cr, Ni, Ba, Mo, V, W, Zn, Sr, Bi, B, Ca, Ga, Ge, La, Pb, In, and Mn. The layer made of oxides of these elements attains an excellent heat resistance. As the oxide layer, one containing an oxide of Mo or W is preferred in particular.

A resin layer containing a resin is also preferred as the outer protective layer. Providing the resin layer as the outer protective layer in addition to the inner protective layer can yield a rare-earth magnet having an excellent heat resistance in addition to a sufficient corrosion resistance.

As the resin contained in the resin layer as the outer protective layer, a thermosetting resin is preferred since it can exhibit a desirable characteristic even in a high-temperature environment (e.g., at 150° C. or higher).

It will be more preferred if the resin constructing the resin layer is at least one species of resin selected from the group consisting of phenol, epoxy, and melamine resins in particular. These resins can form cured products having an extremely excellent heat resistance among resin materials. Therefore, the rare-earth magnet of the present invention equipped with such an outer protective layer attains not only a corrosion resistance but also an extremely excellent heat resistance.

It will also be preferred if the outer protective layer in the rare-earth magnet of the present invention is a metal salt layer. Such a metal salt layer can also enhance the heat resistance of the rare-earth magnet. When a coating or the like is further provided on the surface of the rare-earth magnet, the metal salt layer can also exhibit a characteristic of being able to enhance the adhesion between the magnet body and the coating. Therefore, the rare-earth magnet of the present invention having the surface provided with the metal salt layer becomes excellent in adhesion to coatings, and is also extremely excellent in corrosion resistance and heat resistance after coating.

It will be more preferred if the metal salt layer contains at least one species of element selected from the group consisting of Cr, Ce, Mo, W, Mn, Mg, Zn, Si, Zr, V, Ti, and Fe and at least one species of element selected from the group consisting of P, O, C, and S. The metal salt layer containing these elements attains extremely excellent corrosion resistance and heat resistance.

It will be more preferred if the metal salt layer contains at least one species of element selected from the group consisting of Mo, Ce, Mg, Zr, Mn, and W and at least one species of element selected from the group consisting of P, O, C, and S. The metal salt layer containing these elements attain excellent corrosion resistance and heat resistance in particular.

As the outer protective layer, a layer containing an organic-inorganic hybrid compound having a structural unit made of an organic polymer and a structural unit made of an inorganic polymer is also preferred. The outer protective layer containing such an organic-inorganic hybrid compound is also excellent in the effect of improving the heat resistance of the rare-earth magnet. Such an outer protective layer can exhibit not only the heat resistance but also the following characteristics.

First, the structural unit made of an organic polymer has a characteristic of being soft. Therefore, even when a volume change occurs in a layer containing such a structural unit because of heating or the like applied thereto at the time of forming the layer, thereby generating a stress or the like, the structural unit made of a soft organic polymer can sufficiently alleviate such a stress. Therefore, the outer protective layer is harder to form defects such as cracks and pinholes due to stresses generated at the time of forming. On the other hand, a compound containing a structural unit made of an inorganic polymer has not only an excellent heat resistance but also a characteristic of being harder to transmit moisture and the like therethrough (moisture permeation resistance).

The outer protective layer in the rare-earth magnet of the present invention contains an organic-inorganic hybrid compound having both of these structural units. Therefore, this outer protective layer has both characteristics of these two structural units. Consequently, the rare-earth magnet equipped with such an outer protective layer has excellent corrosion resistance, heat resistance, and moisture resistance.

However, studies by the inventors have revealed that, when a material simply mixing organic and inorganic molecules in order to obtain a protective layer having both of the characteristics mentioned above, the organic and inorganic molecules are easier to separate from each other in the resulting protective layer, whereby there is a case where the protective layer is formed with a region in which any of the above-mentioned characteristics is insufficient.

By contrast, the outer protective layer in the present invention contains an organic-inorganic hybrid compound, i.e., a compound in which a structural unit made of an organic polymer and a structural unit made of an inorganic polymer are combined together by a predetermined interaction. Therefore, the two structural units are rarely separated from each other in this layer. Consequently, the outer protective layer having this organic-inorganic hybrid compound has a homogenous characteristic throughout the layer, and can provide the rare-earth magnet with excellent corrosion resistance, heat resistance, and moisture resistance.

Specifically, it will be preferred if the organic-inorganic hybrid compound is a compound in which a structural unit made of an organic polymer and a structural unit made of an inorganic polymer are combined together by a covalent bond. Also preferred as the organic-inorganic hybrid compound is a compound in which a structural unit made of an organic polymer and a structural unit made of an inorganic polymer are combined together by a hydrogen bond. The organic-inorganic hybrid compound may also be a compound in which a structural unit made of an organic polymer having an aromatic ring and a structural unit made of an inorganic polymer having an aromatic ring are combined together by an interaction between the aromatic rings.

Each of these organic-inorganic hybrid compounds is one in which a structural unit made of an organic molecule and a structural unit made of an inorganic molecule are combined together by a predetermined interaction, and thus is less likely to cause separation and the like in the outer protective layer. The rare-earth magnet equipped with an outer protective layer containing such an organic-inorganic hybrid compound is extremely excellent in heat resistance and moisture resistance in addition to corrosion resistance.

It will be more preferred in the rare-earth magnet of the present invention if the outer protective layer further contains an inorganic additive. The outer protective layer further containing an inorganic additive has a more heat resistance and is also excellent in terms of strength, whereby even shocks and the like exerted during the manufacture and use of the rare-earth magnet are less likely to cause cracks and the like. Therefore, the rare-earth magnet equipped with such an outer protective layer attains more excellent corrosion resistance and heat resistance.

In another aspect, the present invention provides a method of favorably manufacturing the rare-earth magnet of the present invention. Namely, the method of manufacturing a rare-earth magnet in accordance with the present invention is a method of manufacturing a rare-earth magnet by forming a protective layer on a surface of a magnet body containing a rare-earth element, the method comprising a protective layer forming step of heat-treating the magnet body so as to form a protective layer having a first layer covering the magnet body and containing a rare-earth element and a second layer covering the first layer and containing substantially no rare-earth element.

The method of manufacturing a rare-earth magnet in accordance with the present invention may be a method of manufacturing a rare-earth magnet by forming a protective layer on a surface of a magnet body containing a rare-earth element, the method comprising a protective layer forming step of heat-treating the magnet body so as to form a protective layer having a first layer covering the magnet body and containing a rare-earth element and a second layer covering the first layer and containing a rare-earth element by an amount smaller than that in the first layer.

Preferably, in the method of manufacturing a rare-earth magnet, the magnet body is heat-treated in the protective layer forming step in an oxidizing atmosphere containing an oxidizing gas while adjusting at least one condition of a partial pressure of the oxidizing gas, a treatment temperature, and a treatment time such that the protective layer has the first layer and the second layer.

When at least one condition of the partial pressure of the oxidizing gas, treatment temperature, and treatment time at the time of heat-treating the magnet body in an oxidizing atmosphere is adjusted while using the structure of a film (oxidized film) formed on the surface of the rare-earth magnet as an index, corrosion can be restrained from occurring in excess in an oxidizing atmosphere in which the rare-earth magnet is likely to corrode, and a rare-earth magnet having a sufficient corrosion resistance can be obtained. Such a manufacturing method can form a protective layer very easily at low cost, a protective layer having a uniform thickness, and a rare-earth magnet which is excellent in dimensional precision. In particular, it will be preferred in this manufacturing method if the magnet body is heat-treated while adjusting the partial pressure of the oxidizing gas, treatment temperature, and treatment time. Adjusting these three conditions can yield a rare-earth magnet having a sufficient corrosion resistance more easily and reliably.

Preferably, the manufacturing method of the present invention further comprises a pickling step of pickling the magnet body prior to the heat treatment. Pickling the magnet body prior to the above-mentioned heat treatment can remove denatured layers and oxidized layers formed on the magnet body surface during or after the manufacture of the magnet body, whereby a desirable protective layer can be formed more accurately.

Preferably, in the manufacturing method of the present invention, the oxidizing atmosphere is a steam atmosphere having a steam partial pressure of 10 to 2000 hPa. This allows the above-mentioned first and second layers to be formed favorably, whereby the corrosion resistance of the rare-earth magnet further improves.

It will be more preferred in the manufacturing method of the present invention if the treatment time is 1 min to 24 hr. This allows the above-mentioned first and second layers to be formed favorably, and makes it very hard for the heat treatment and the like to deteriorate characteristics of the magnet body.

The method of manufacturing a rare-earth magnet in accordance with the present invention may be a method of manufacturing a rare-earth magnet by forming a protective layer on a surface of a magnet body containing a rare-earth element, the method comprising an inner protective layer forming step of heat-treating the magnet body so as to form an inner protective layer covering the magnet body and containing a rare-earth element and/or a transition element and oxygen, and an outer protective layer forming step of forming an outer protective layer made of a constituent material different from that of the inner protective layer on a surface of the inner protective layer.

Such a manufacturing method can yield a rare-earth magnet comprising a plurality of protective layers, i.e., inner and outer protective layers, made of respective constituent materials different from each other, which is extremely excellent in heat resistance in addition to corrosion resistance.

It will be preferred in the inner protective layer forming step if the magnet body is heat-treated so as to form the inner protective layer having a first layer covering the magnet body and containing a rare-earth element and a second layer covering the first layer and containing substantially no rare-earth element. The magnet body may be heat-treated so as to form the inner protective layer having a first layer covering the magnet body and containing a rare-earth element and a second layer covering the first layer and containing a rare-earth element by an amount smaller than that in the first layer. This forms the first and second layers extremely excellent in corrosion resistance as mentioned above as the inner protective layer, whereby the corrosion resistance of the resulting rare-earth magnet further improves.

Preferably, in the inner protective layer forming step, the magnet body is heat-treated in an oxidizing atmosphere containing an oxidizing gas while adjusting at least one condition of a partial pressure of the oxidizing gas, a treatment temperature, and a treatment time such that the protective layer has the first layer and the second layer. Adjusting these conditions can favorably form the first and second layers.

Preferably, in the outer protective layer forming step, the outer protective layer made of an oxide layer having a composition different from the inner protective layer is formed on the surface of the inner protective layer. The outer protective layer made of such an oxide layer can provide the rare-earth magnet with an excellent heat resistance.

In the outer protective layer forming step, a resin layer forming coating liquid containing a resin may be applied onto the surface of the inner protective layer and dried so as to form the outer protective layer made of a resin layer. The rare-earth magnet equipped with thus formed resin layer is also extremely excellent in corrosion resistance and heat resistance. When the resin is at least one species of resin selected from the group consisting of phenol, epoxy, and melamine resins in particular, a more excellent heat resistance can be obtained.

In the outer protective layer forming step, the magnet body after the inner protective layer forming step may be subjected to chemical conversion treatment so as to form the outer protective layer made of a chemical conversion layer on the surface of the inner protective layer. Thus formed outer protective layer can also provide the rare-earth magnet with an excellent heat resistance.

It will also be preferred in the outer protective layer forming step if the outer protective layer made of a layer containing an organic-inorganic hybrid compound having a structural unit made of an organic polymer and a structural unit made of an inorganic polymer is formed on the surface of the inner protective layer. The rare-earth magnet equipped with the outer protective layer containing such an organic-inorganic hybrid compound attains an excellent moisture resistance in addition to the corrosion resistance and heat resistance as mentioned above.

Another method of manufacturing a rare-earth magnet in accordance with the present invention is a method of manufacturing a rare-earth magnet by heat-treating a magnet body containing a rare-earth element so as to form a protective layer on a surface of the magnet body, the method comprising a pickling step of pickling the magnet body, and a heat-treating step of heat-treating the pickled magnet body in an oxidizing atmosphere containing an oxidizing gas. Such a heat-treating step is preferably performed subsequent to the pickling step, more preferably immediately after the pickling.

Performing such a pickling step can remove a number of irregularities, oxidized layers, and processed and denatured layers on the magnet body surface, thereby cleaning the surface. This can form a desirable oxidized film more accurately in the heat-treating step after the pickling.

In particular, when the magnet body containing an unprocessed part is pickled in the pickling step after sintering, a rare-earth-rich layer which is likely to remain as oozing from within the magnet body to the surface at the time of sintering can be removed. This is effective in forming a desirable film in particular.

Effect of the Invention

The present invention can provide a rare-earth magnet having a sufficient corrosion resistance, and a method of manufacturing the same.

EXPLANATIONS OF NUMERALS

Figure 1:
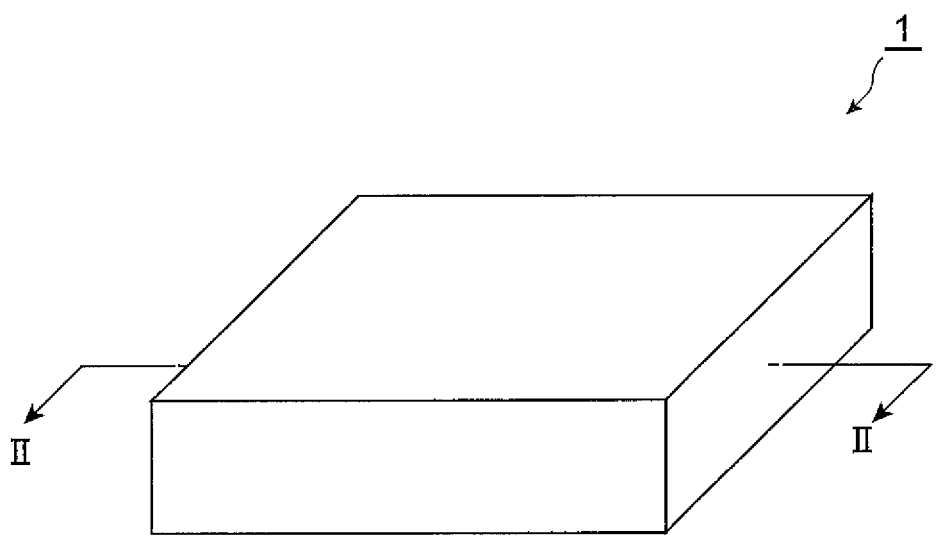
FIG. 1 A schematic perspective view showing the rare-earth magnet in accordance with a first embodiment.

1 . . . rare-earth magnet; 3 . . . magnet body; 5 . . . protective layer; 5a . . . first layer; 5b . . . second layer; 10 . . . rare-earth magnet; 13 . . . magnet body; 15 . . . protective layer; 16 . . . first layer; 17 . . . second layer; 18 . . . inner protective layer; 19 . . . outer protective layer.

BEST MODES FOR CARRYING OUT THE INVENTION

In the following, preferred embodiments of the present invention will be explained in detail with reference to the drawings as necessary. In the drawings, the same constituents will be referred to with the same numerals without repeating their overlapping explanations. Positional relationships such as upper, lower, left, and right are based on those shown in the drawings unless otherwise specified. Dimensional ratios in the drawings are not limited to those depicted.

First Embodiment

To begin with, a first embodiment of the rare-earth magnet and method of manufacturing the same in accordance with the present invention will be explained. The rare-earth magnet of the first embodiment comprises a magnet body containing a rare-earth element, and a protective layer formed on a surface of the magnet body, whereas the protective layer includes a first layer covering the magnet body and containing a rare-earth element, and a second layer covering the first layer and containing substantially no rare-earth element.

Figure 2:
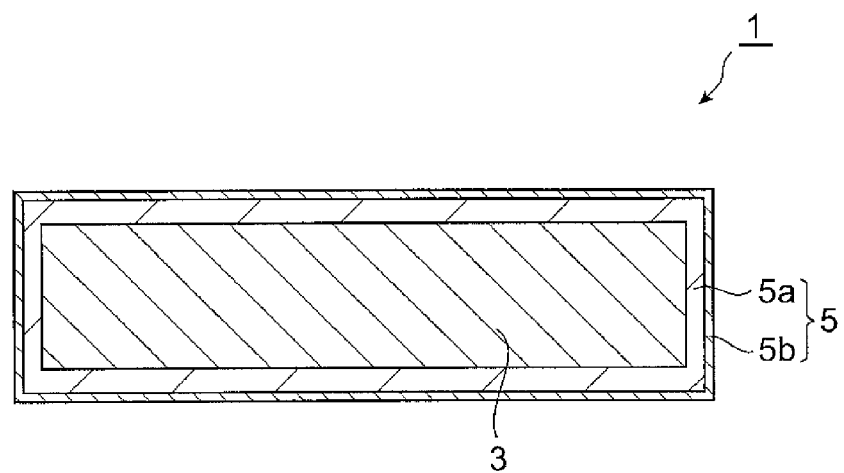
FIG. 2 A view schematically showing a cross-sectional structure appearing when the rare-earth magnet shown in FIG. 1 is cut along the line II-II.

FIG. 1 is a schematic perspective view showing the rare-earth magnet in accordance with the first embodiment. FIG. 2 is a view schematically showing a cross-sectional structure appearing when the rare-earth magnet shown in FIG. 1 is cut along the line II-II. As shown in FIGS. 1 and 2, the rare-earth magnet 1 of this embodiment is constructed by a magnet body 3 and a protective layer 5 formed so as to cover all the surfaces of the magnet body 3.

Magnet Body

The magnet body 3 is a permanent magnet containing a rare-earth element. In this case, the rare-earth element refers to scandium (Sc), yttrium (Y), and lanthanide elements belonging to Group 3 in the long-period periodic table. Examples of the lanthanide elements include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

Examples of constituent materials for the magnet body 3 include those containing the rare-earth element and a transition element other than the rare-earth element in combination. In this case, the rare-earth element is preferably at least one species of element selected from the group consisting of Nd, Sm, Dy, Pr, Ho, and Tb, and more preferably further contains at least one species of element selected from the group consisting of La, Ce, Gd, Er, Eu, Tm, Yb, and Y in addition to the former elements.

Preferred as the transition element other than the rare-earth element is at least one species of element selected from the group consisting of iron (Fe), cobalt (Co), titanium (Ti), vanadium (V), chromium (Cr), manganese (Mn), nickel (Ni), copper (Cu), zirconium (Zr), niobium (Nb), molybdenum (Mo), hafnium (Hf), tantalum (Ta), and tungsten (W), more preferred being Fe and/or Co.

More specific examples of constituent materials for the magnet body 3 include those based on R—Fe—B and R—Co. Rare-earth elements mainly composed of Nd are preferred as R in the former constituent material, whereas rare-earth elements mainly composed of Sm are preferred as R in the latter constituent material.

Preferred in particular as constituent materials for the magnet body 3 are those based on R—Fe—B. Such a material has a main phase of a substantially tetragonal crystal structure, whereas a rare-earth-rich phase with a higher compounding ratio of a rare-earth element and a boron-rich phase with a higher compounding ratio of boron atoms are provided near a grain boundary part of the main phase. The rare-earth-rich phase and boron-rich phase are nonmagnetic phases without magnetism. A magnet constituent material usually contains such nonmagnetic phases by 0.5 to 50 vol %. The particle size of the main phase is usually about 1 to 100 µm.

It will be preferred in such an R—Fe—B-based constituent material if the rare-earth element content is 8 to 40 atom %. When the rare-earth element content is less than 8 atom %, the main phase attains substantially the same crystal structure as that of α-iron, whereby coercive force (iHc) tends to decrease. When the content exceeds 40 atom %, on the other hand, the rare-earth-rich phase is formed in excess, whereby residual magnetic flux density (Br) tends to decrease.

Preferably, the Fe content is 42 to 90 atom %. The residual magnetic flux density tends to decrease when the Fe content is less than 42 atom %, whereas the coercive force tends to decrease when the content exceeds 90 atom %. Preferably, the B content is 2 to 28 atom %. When the B content is less than 2 atom %, a rhombohedral structure is likely to form, whereby the coercive force tends to decrease. When the B content exceeds 28 atom %, the boron-rich phase is formed in excess, whereby the residual magnetic flux density tends to decrease.

In the above-mentioned constituent material, Fe in the R—Fe—B system may partly be replaced by Co. Thus partly replacing Fe with Co can improve the temperature characteristic without lowering the magnetic characteristic. In this case, it will be desirable if the amount replaced by Co is not greater than the Fe content. When the Co content exceeds the Fe content, the magnetic characteristic of the magnet body tends to decrease.

B in the constituent material may partly be replaced by an element such as carbon (C), phosphorus (P), sulfur (S), or copper (Cu). Thus partly replacing B makes it easier to manufacture the magnet body and can cut down the manufacturing cost. Here, the amount replaced by these elements is desirably an amount which does not substantially affect the magnetic characteristic, and is preferably 4 atom % or less with respect to the total amount of constituent atoms.

From the viewpoint of improving the coercive force, cutting down the manufacturing cost, and so forth, elements such as aluminum (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (Ge), tin (Sn), zirconium (Zr), nickel (Ni), silicon (Si), gallium (Ga), copper (Cu), and hafnium (Hf) may be added to the above-mentioned structure. Their added amount preferably falls within a range not affecting the magnetic characteristic, and is 10 atom % or less with respect to the total amount of constituent atoms. In addition, oxygen (O), nitrogen (N), carbon (C), calcium (Ca), and the like are considered to be inevitably mingling components. They may be contained by an amount of about 3 atom % or less with respect to the total amount of constituent atoms.

The magnet body 3 having such a structure can be manufactured by powder metallurgy. First, in this method, an alloy having a desirable composition is made by a known alloy manufacturing process such as casting or strip casting. Subsequently, the alloy is pulverized into a particle size of 10 to 100 µm with a coarse pulverizer such as jaw crusher, Brown mill, or stamp mill, and then further into a particle size of 0.5 to 5 µm with a fine pulverizer such as jet mill or attritor. Thus obtained powder is molded at a pressure of 0.5 to 5 t/cm$^2$ preferably in a magnetic field having a magnetic field intensity of 600 kVA/m or greater.

Thereafter, thus obtained molded body is sintered for 0.5 to 10 hr at 1000 to 1200° C. preferably in an inert gas atmosphere or vacuum, and then is rapidly cooled. This sintered body is further heat-treated for 1 to 5 hr at 500 to 900° C. in an inert gas atmosphere or vacuum, and is processed into a desirable form (practical form) as necessary, so as to yield the magnet body 3.

Preferably, thus obtained magnet body 3 is further pickled. Namely, it will be preferred if the surface of the magnet body 3 is pickled prior to heat treatment which will be explained later.

Nitric acid is preferable as an acid used in pickling Nonoxidizing acids such as hydrochloric acid and sulfuric acid are often used when plating typical steel materials. When the magnet body 3 containing a rare-earth element as in this embodiment is treated with these acids, however, hydrogen generated by the acids is occluded in the surface of the magnet body 3, so that the occluded part embrittles, thereby generating a large amount of powdery undissolved product. Since the powdery undissolved product causes roughening, defects, poor adhesion, and the like after surface treatment, it will be preferred if the above-mentioned nonoxidizing acids are not contained in a pickling treatment liquid. Therefore, nitric acid which is an oxidizing acid generating less hydrogen is preferably used.

The amount of the surface of the magnet body 3 dissolved by such pickling is preferably 5 µm or greater, more preferably 10 to 15 µm, by an average thickness from the surface. Completely removing denatured layers and oxidized layers due to processing of the surface of the magnet body 3 allows heat treatment, which will be explained later, to form a desirable oxidized film more accurately.

The nitric acid concentration of a processing liquid used for pickling is preferably 1 N or less, 0.5 N or less in particular. When the nitric acid concentration is too high, the dissolving rate of the magnet body 3 becomes so high that the dissolving amount is harder to regulate, which causes a greater deviation in bulk processing such as barrel processing in particular, whereby the dimensional precision of the product is harder to maintain. When the nitric acid concentration is too low, the dissolving amount tends to be insufficient. Therefore, the nitric acid concentration is preferably 1 N or less, 0.5 to 0.05 N in particular. The dissolving amount of Fe at the end of processing is about 1 to 10 g/l.

It will be preferred if the pickled magnet body 3 is subjected to washing with ultrasonic waves in order to completely remove a small amount of undissolved products and remaining acid components. It will be preferred if the ultrasonic washing is performed in deionized water in which the amount of chlorine ions generating rust on the surface of the magnet body is very small. If necessary, similar water washing may be performed before and after the ultrasonic washing and in each step of pickling.

Protective Layer

The protective layer 5 contains an element derived from the magnet body 3 and oxygen, and has a first layer 5a covering the magnet body 3 and containing a rare-earth element, and a second layer 5b covering the first layer 5a and containing a rare-earth element by an amount smaller than that in the first layer. More specifically, it contains an element constructing the above-mentioned main phase in the magnet body 3 and oxygen.

Here, the element derived from the magnet body 3 is a constituent material of the magnet body 3, contains at least a rare-earth element and a transition element other than the rare-earth element, and may further contain B, Bi, Si, Al, and the like. The protective layer 5 is neither applied nor attached onto the magnet body 3, but is constituted by an element appearing on the magnet body 3 as the magnet body 3 itself changes by oxidizing and the like. Therefore, the protective layer 5 does not contain new metal elements which do not construct the magnet body, but may contain nonmetal elements such as oxygen and nitrogen.

The first layer 5a contains an element derived from the magnet body 3 such as a rare-earth element, and oxygen, and more specifically contains oxygen, a rare-earth element, and a transition element other than the rare-earth element. When the constituent material for the magnet body 3 is based on R—Fe—B, the transition element is mainly composed of Fe and may contain Co and the like depending on the composition of the constituent material.

While the second layer 5b contains an element derived from the magnet body 3 and oxygen, its rare-earth element content is smaller than that in the first layer. When the constituent material for the magnet body 3 is based on R—Fe—B, the transition element is mainly composed of Fe and may contain Co and the like depending on the composition of the constituent material. From the viewpoint of attaining more excellent corrosion resistance due to the second layer 7, the second layer 7 preferably contains a rare-earth element by an amount which is one half or less of that in the first layer 6, and more preferably is a layer containing substantially no rare-earth element. Namely, it will be preferred in particular if the second layer 7 contains oxygen and a transition element other than the rare-earth element contained in the magnet body 3.

Contents of individual constituent materials in the first layer 5a and second layer 5b can be verified by a known composition analyzing method such as EPMA (x-ray microanalyzer method), XPS (x-ray photoelectron spectroscopy), AES (Auger electron spectroscopy), or EDS (energy-dispersive fluorescent x-ray spectroscopy).

Here, a mode in which no rare-earth element is detected by the above-mentioned EPMA, XPS, AES, or EDS is considered to be a mode containing substantially no rare-earth element. Namely, in the second layer 5b, the rare-earth element content is about the detection limit by the above-mentioned composition analyzing method or less. In other words, the second layer 5b may contain a rare-earth element by an amount not exceeding the detection limit by the above-mentioned composition analyzing method.

The protective layer 5 is formed by heat-treating (heating) the magnet body 3 in an oxidizing atmosphere containing an oxidizing gas while adjusting at least one of a partial pressure of the oxidizing gas, a treatment temperature, and a treatment time such that the protective layer attains the above-mentioned structure. It will be preferred if three conditions of the oxidizing gas, treatment temperature, and treatment time are adjusted at the time of heat treatment.

Here, the oxidizing atmosphere is not limited in particular as long as it is an atmosphere containing an oxidizing gas, examples of which include atmospheres promoting oxidization such as air, oxygen atmospheres (preferably atmospheres with a regulated oxygen partial pressure) and steam atmospheres (preferably atmospheres with a regulated steam partial pressure). Though not restricted in particular, examples of the oxidizing gas include oxygen and steam. For example, an oxygen atmosphere is an atmosphere whose oxygen concentration is at least 0.1%, whereas an inert gas coexists with oxygen. Namely, a mode of the oxygen atmosphere is an atmosphere composed of oxygen and an inert gas. For example, the steam atmosphere is an atmosphere having a steam partial pressure of 10 hPa or higher, whereas an inert gas coexists with steam in this atmosphere. An example of the inert gas is nitrogen, whereas a mode of the steam atmosphere is an atmosphere composed of steam and the inert gas. The oxidizing gas is preferably a steam atmosphere, since the protective layer can be formed more easily thereby. Another example of the oxidizing atmosphere is an atmosphere containing oxygen, steam, and an inert gas.

First, when adjusting the condition mentioned above, a correlation between the structure of the protective layer 5 and at least one condition of the oxidizing gas partial pressure, treatment temperature, and treatment time is determined. Next, according to this correlation, at least one condition of the oxidizing gas partial pressure, treatment temperature, and treatment time is adjusted at the time of heat treatment such that the protective layer 5 attains the specific structure mentioned above.

Here, the treatment temperature is preferably adjusted within the range of 200 to 550° C., more preferably within the range of 250 to 500° C. The magnetic characteristic tends to deteriorate when the treatment temperature exceeds the upper limit mentioned above, whereas a desirable oxidized film is harder to form when the temperature is less than the lower limit mentioned above.

The treatment time is preferably adjusted within the range of 1 min to 24 hr, more preferably within the range of 5 min to 10 hr. The magnetic characteristic tends to deteriorate when the treatment time exceeds the upper limit mentioned above, whereas a desirable oxidized film is harder to form when the time is less than the lower limit mentioned above.

When the oxidizing atmosphere is a steam atmosphere here, a correlation between the structure of the protective layer 5 and at least one condition of the steam partial pressure, treatment temperature, and treatment time is determined at first. Next, according to this correlation, at least one condition of the steam gas partial pressure, treatment temperature, and treatment time is adjusted at the time of heat treatment such that the protective layer 5 attains the specific structure mentioned above.

In this case, it will be preferred if the treatment temperature and treatment time are adjusted within the ranges mentioned above. The steam partial pressure is preferably adjusted within the range of 10 to 2000 hPa. When the steam partial pressure is less than 10 hPa, it is harder for the protective layer 5 to attain the two-layer structure mentioned above. When the partial pressure exceeds 2000 hPa, on the other hand, this high pressure not only complicates the system structure, but also makes condensation and the like easier to occur, etc., whereby workability tends to become worse.

The total thickness of the first layer 5a and second layer 5b is preferably greater than 0.1 μm, more preferably 1 μm or greater. When the total thickness is 0.1 μm or less, a protective layer having a two-layer structure is harder to form. On the other hand, the total thickness of the first layer 5a and second layer 5b is preferably less than 20 μm, more preferably 5 μm or less. When the total thickness is 20 μm or greater, the oxidized film is harder to form, or the magnetic characteristic tends to become lower.

The thickness of the second layer 5b is preferably 5 nm or greater. When the thickness is less than 5 nm, it is too thin, whereby the effect of suppressing corrosion tends to become insufficient.

Second Embodiment

A second embodiment of the rare-earth magnet and method of manufacturing the same in accordance with the present invention will now be explained. The rare-earth magnet of the second embodiment comprises a magnet body containing a rare-earth element, and a protective layer formed on a surface of the magnet body, whereas the protective layer includes an inner protective layer containing a rare-earth element and/or a transition element and oxygen, and an outer protective layer made of a constituent material different from that of the inner protective layer. In the rare-earth magnet of the second embodiment, the inner protective layer has a structure comprising a first layer covering the magnet body and containing a rare-earth element, and a second layer covering the first layer and containing substantially no rare-earth element.

Figure 3:
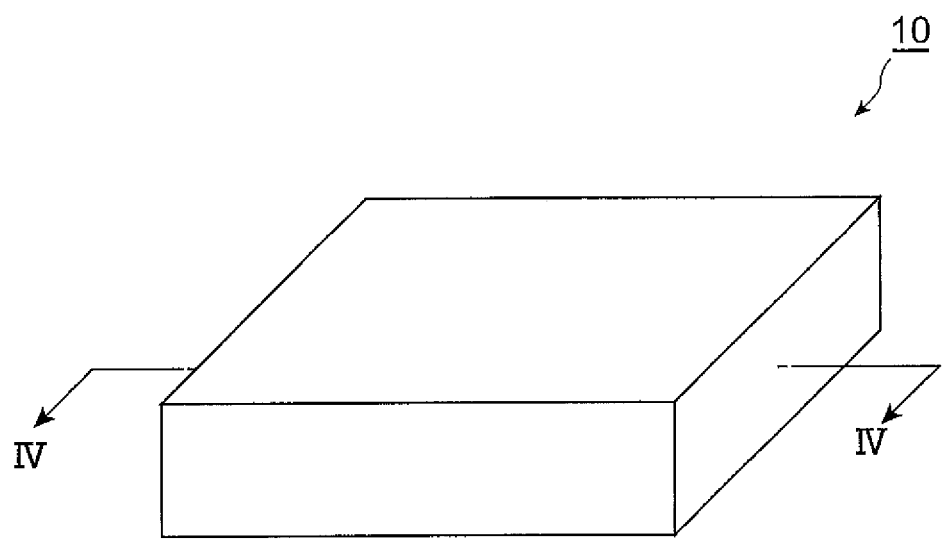
FIG. 3 A schematic perspective view showing the rare-earth magnet in accordance with a second embodiment.
Figure 4:
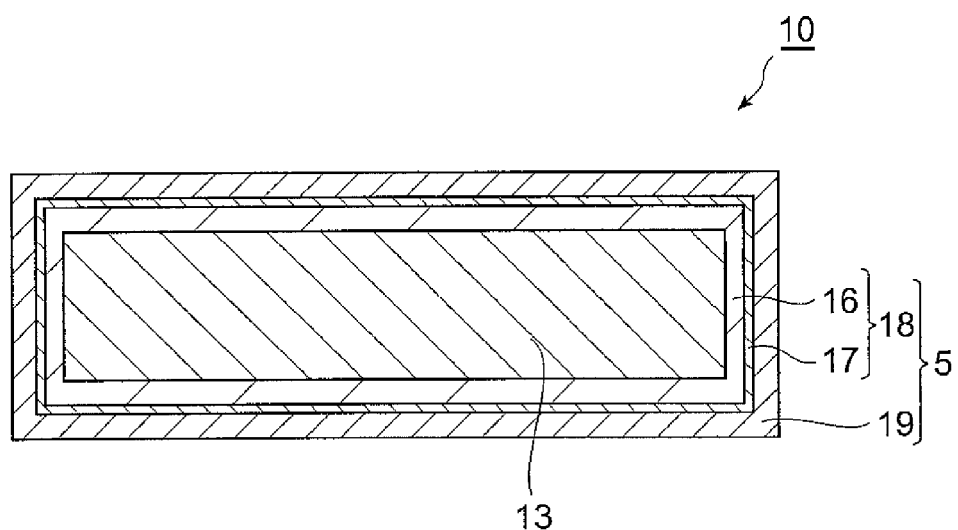
FIG. 4 A view schematically showing a cross-sectional structure appearing when the rare-earth magnet shown in FIG. 3 is cut along the line IV-IV.

FIG. 3 is a schematic perspective view showing the rare-earth magnet in accordance with the second embodiment. FIG. 4 is a view schematically showing a cross-sectional structure appearing when the rare-earth magnet shown in FIG. 3 is cut along the line IV-IV. As shown in FIGS. 3 and 4, the rare-earth magnet 10 of this embodiment is constructed by a magnet body 13 and a protective layer 15 formed so as to cover all the surfaces of the magnet body 3. The protective layer 15 has an inner protective layer 18 and an outer protective layer 19 successively from the magnet body 13 side. The inner protective layer 18 comprises a first layer 16 and a second layer 17 successively from the magnet body 13 side. Individual constituents of the rare-earth magnet 10 will now be explained.

Magnet Body

The magnet body 13 is a permanent magnet containing a rare-earth element, and preferably contains a rare-earth element and a transition element other than this rare-earth element. Preferred as such a magnet body 13 is one having the same structure as that shown in the above-mentioned first embodiment.

Protective Layer

The protective layer 15 comprises the inner protective layer 18 and outer protective layer 19 successively from the magnet body 13 side as mentioned above. The inner protective layer 18 comprises the first layer 16 and second layer 17 successively from the magnet body 13 side, whereas examples of such first layer 16 and second layer 17 include those similar to the first layer 5a and second layer 5b in the above-mentioned first embodiment.

The outer protective layer 19 is a layer formed on the surface of the inner protective layer 18 and, unlike the inner protective layer 18, is not a layer formed by a reaction of the magnet body 13, but a layer newly and separately formed on the surface of the magnet body 13. Therefore, the outer protective layer 19 does not contain elements derived from the magnet body 13.

While the outer protective layer 19 may be made of various constituent materials, any of an oxide layer, a resin layer, a metal salt layer, and a layer containing an organic-inorganic hybrid compound is preferred in this embodiment. Each of these outer protective layers 19 will now be explained.

(1) Oxide Layer

The oxide layer is formed so as to cover the inner protective layer 18 (second layer 17), and is a layer made of an oxide having a composition different from the inner protective layer 18.

Such an oxide layer may be either crystalline or amorphous, but is preferably amorphous. An amorphous oxide layer has less grain boundary parts which are relatively easier to deteriorate in a crystalline structure, and thus can exhibit excellent corrosion resistance and heat resistance.

Examples of the oxide layer include layers made of metal oxides. A layer constructed by an oxide of Al, Ta, Zr, Hf, Nb, P, Si, Ti, Mg, Cr, Ni, Ba, Mo, V, W, Zn, Sr, Bi, B, Ca, Ga, Ge, La, Pb, In, or Mn, for example, is preferred, whereas a layer may contain a plurality of species of them. Among them, an oxide of Mo, Mg, or W is preferred, an oxide of Mo or W is more preferred, and an oxide of Mo is preferred in particular. These oxide layers can exhibit particularly excellent corrosion resistance and heat resistance. Though a preferred oxide layer contains an oxide of any of the above-mentioned elements, it is not always constructed by such an oxide alone, but oxygen in the oxide may be partly replaced by nitrogen (N), sulfur (S), or the like. A specific example is silicon oxynitride ($SiO_xN_{1-x}$ ($0<x<1$)). In general, $SiO_xN_{1-x}$ ($0<x<1$) is an n-type semiconductor.

From the viewpoint of attaining a better corrosion resistance, it will be preferred in the protective layer 15 equipped with an oxide layer as the outer protective layer 19 if the outer protective layer 19 comprises a layer made of a p-type oxide semiconductor and a layer made of an n-type oxide semiconductor formed on the outer side thereof. The second layer 17 may be constructed by a p-type oxide semiconductor, while the oxide layer may be constructed by an n-type oxide semiconductor. Such a structure makes it harder for the rare-earth element contained in the magnet body 13 to cause an oxidizing reaction, whereby the deterioration of not only the magnet body 13 but also the rare-earth magnet 10 is effectively reduced.

Examples of combinations of such an outer protective layer 19 include combinations with an oxide layer formed from an oxide of Cr, Cu, Mn, or Ni when the magnet body 13 is made of a constituent material based on R—Fe—B.

Examples of methods of forming the outer protective layer 19 made of an oxide layer include known film-forming techniques typified by vapor-phase growth methods such as vacuum deposition, sputtering, ion plating, CVD, and thermal spraying; liquid-phase growth methods such as coating and solution deposition; and sol-gel method. Among them, a vapor-phase growth method (dry process) is preferably used, and reactive vapor deposition, reactive sputtering, reactive ion plating, plasma CVD, thermal CVD, or Cat-CVD is more preferably used. Such a dry process can prevent functions of the rare-earth magnet 10 from lowering as the constituent material of the magnet body 13 is eluted.

From the viewpoint of forming the oxide layer at lower cost, a method which can uniformly form a large area at once is preferred. Examples of such a method of forming an oxide layer include sputtering and CVD. Their specific methods may adopt and employ a film-forming technique of uniformly forming a layer having a large area, which has been established in the field of flat panel displays and the like.

For example, when forming an oxide layer made of an oxide semiconductor as mentioned above, atmospheric thermal CVD using alkoxide as a material is preferably employed. This method can inexpensively form an oxide layer having a favorable quality. Examples of the alkoxide used in the material include metal alkoxides such as $Si(OC_2H_5)_4$, $B(OCH_3)_3$, $B(OC_2H_5)_3$, $Ge(OC_2H_5)_4$, $Al(CH_3COCHCOCH_3)_2$, $Al(O\text{-}i\text{-}C_3H_7)_3$, $Ga(O\text{-}i\text{-}C_3H_7)_3$, $In(O\text{-}i\text{-}C_3H_7)_3$, $Sn(O\text{-}i\text{-}C_3H_7)_4$, $Pb(O\text{-}i\text{-}C_3H_7)_2$, $Bi(O\text{-}t\text{-}C_5H_{11})_3$, $Ti(O\text{-}i\text{-}C_3H_7)_4$, $TiO(CH_3COCHCOCH_3)_2$, $V(OCH_2H_5)_3$, $VO(CH_3COCHCOCH_3)_2$, $Cr(CH_3COCHCOCH_3)_3$, $Fe(O\text{-}i\text{-}C_3H_7)_3$ $Co(CH_3COCHCOCH_3)_3$, $Co(CH_3COCHCOCH_3)_2$, $Ni(O_2C_5H_7)_3$, $Ni(CH_3COCHCOCH_3)_2$, $Cu(O_2C_5H_7)_3$, $Cu(CH_3COCHCOCH_3)_2$, $Zn(OC_2H_5)_2$, $Zn(CH_3COCHCOCH_3)_2$, $Zr(O\text{-}i\text{-}C_3H_7)_4$, $Zr(O\text{-}t\text{-}C_4H_9)_4$, $Zr(O\text{-}n\text{-}C_4H_9)_4$, $Nb(OC_2H_5)_5$, $Mo(OC_2H_5)_5$, $Hf(O\text{-}i\text{-}C_3H_7)_4$, $Ta(OC_2H_5)_5$, $W(OC_2H_5)_5$, $Mg(OC_2H_5)_2$, $Ca(OC_2H_5)_2$, $Sr(O\text{-}i\text{-}C_3H_7)_2$, $Ba(OC_2H_5)_2$, $La(O\text{-}i\text{-}C_3H_7)_3$, $P(OCH_3)_3$, $PO(OCH_3)_3$, $PO(OC_2H_5)_3$, $Cr(OC_2H_5)_3$, $Mo(C_5H_5O_2)_2$, $Mo(C_5H_7O_2)_2$, and $MoO_2(C_5H_7O_2)_2$.

In general, vacuum deposition employs a point source as its vapor deposition source, and thus is disadvantageous when used for forming a display which requires a layer having a large area to be formed uniformly at once. However, the rare-earth magnet 10 of this embodiment is relatively small in size, whereby the oxide layer can easily be formed by vapor deposition as well. Nevertheless, the cost of forming the oxide layer tends to be higher in vapor deposition, since the area of a film formed thereby at once is small. Therefore, when using vapor deposition, it is desirable that the film-forming rate be raised in order to lower the cost of forming the oxide layer. When the film-forming rate is too high, however, coarse particles such as splashes may occur, thereby failing to yield the oxide layer having a uniform surface.

Ion plating is a technique in which a coating material (a coating material for the oxide layer in this embodiment) and a substrate to be coated (the magnet body 13 formed with the inner protective layer 18 in this embodiment) are arranged as an anode and a cathode in a pressure-reduced container, the anode is heated in the presence or absence of a reactive gas, so as to turn the coating material into atoms, molecules, or fine particles, which are then ionized by thermoelectrons or the like and attached to the substrate to be coated at the cathode.

Employable as a method of heating a material to be ionized in the ion plating is resistance heating of crucible type or direct resistance heating type, high-frequency induction heating, or electron-beam heating. Among them, resistance heating tends to be unsuitable for forming an inorganic compound having a low vapor pressure. Though electron beam heating can evaporate various materials, coarse particles such as splashes may occur when the film-forming rate is high, whereby the oxide layer having a uniform surface may not be obtained.

Ion plating employs a point vapor deposition source, and thus tends to be harder to form an oxide layer at relatively low cost as with the above-mentioned vacuum deposition. For forming an oxide layer at relatively low cost by using ion plating, it will be sufficient if a film-forming apparatus utilizing a high-density plasma by a pressure-gradient hollow cathode type plasma gun proposed in "Monthly DISPLAY", September 1999 issue, p. 28 is employed. This method is one kind of ion plating, and uses a sheet-like plasma described in Japanese Patent Application Laid-Open No. HEI 2-209475, thereby being able to form a layer having a large area uniformly at relatively low cost. Also, the ionizing ratio of the plasma gun is much higher in this method than that conventionally available, so that evaporated particles attain a higher ratio of ionization, which tends to be effective in that the film density can be kept high even when the substrate temperature is relatively low, an effect of improving film qualities such as crystallinity including the surface form and reactivity is obtained, and so forth.

Though not restricted in particular, the film-forming temperature at the time of forming the oxide layer is preferably such that the heat history at the time of film-forming does not deteriorate the magnetic characteristic of the magnet body 13. From such a viewpoint, the film-forming temperature is preferably 500° C. or less, more preferably 300° C. or less.

Though the composition of the atmosphere gas at the time of forming the oxide layer is not limited in particular, it will be preferred if the film-forming rate, the substrate temperature, or the oxygen concentration in the atmosphere gas is adjusted, for example, when the oxygen content in the oxide layer is to be made smaller than the stoichiometric amount of oxygen in an oxide constituting the oxide layer. Specifically, when the film-forming condition is adjusted such that the film-forming rate becomes 0.4 nm/sec or higher in the case where aluminum oxide is used as a constituent material for the oxide layer, for example, the oxygen content in the resulting oxide layer tends to become less than 1.5 times the Al content based on atoms. Here, the film-forming condition refers to a condition under which a substance to be ionized is heated in the case of the above-mentioned ion plating, for example. Also, the input power in resistance heating and high-frequency induction heating, the amount of current of electron beams in electron-beam heating, and so forth correspond to their film-forming conditions.

When forming the oxide layer, a metal element constituting an oxide may initially be formed, and then postprocessing such as high-temperature oxidization, plasma oxidization, or anode oxidization may be performed, so as to regulate the amount of oxygen.

Another example of the method of forming the oxide layer is diffusion coating. The diffusion coating is a method in which a film of a metal or the like is formed by sputtering or the like, and then is heated to 200 to 500° C., so as to be oxidized in the air.

Though the above-mentioned example exemplifies a single-layer structure as the oxide layer acting as the outer protective layer 19, the oxide layer may be constructed by a plurality of layers. Though the oxide layer is supposed to contain no element derived from the magnet body, it may contain an element derived from the magnet body by moving through the inner protective layer 18, for example, to such an extent that characteristics of the layer are not lowered thereby.

(2) Resin Layer

A resin layer, which is another example of the outer protective layer 19, is formed so as to cover the inner protective layer 18 (second layer 17), and is constructed so as to contain a resin. Though the resin may be either a synthetic resin or a natural resin, a synthetic resin is preferred, and a thermosetting resin is more preferred.

Examples of the thermosetting resin include phenol resins, epoxy resins, urethane resins, silicone resins, melamine resins, epoxy-melamine resins, and thermosetting acrylic resins. Examples of thermoplastic resins include vinyl resins made from vinyl compounds such as acrylic acid, ethylene, styrene, vinyl chloride, and vinyl acetate. The resin layer may also contain metal particles, oxide particles, and the like.

The resin layer is formed by using the resins mentioned above. Namely, it can be formed by dissolving any of the above-mentioned resins into an organic solvent, so as to prepare a coating liquid for forming a resin layer, applying the coating liquid onto the surface of the inner protective layer 18, and then drying the coating liquid.

Though the coating method at the time of forming the resin layer is not limited in particular, its examples include dip coating, dip-spin coating, and spray coating. The resin layer may be formed by applying the coating liquid for forming a resin layer once or a plurality of times. Forming the resin layer by applying the coating liquid a plurality of times is less likely to yield uncoated parts.

The thickness of the resin layer acting as the outer protective layer 19 is preferably 0.1 to 100 μm, more preferably 1 to 50 μm.

The resin constituting the resin layer acting as the outer protective layer 19 is preferably a layer containing a phenol resin, epoxy resin, or melamine resin among those mentioned above. More preferred is a layer containing a phenol resin or epoxy resin and a melamine resin in combination in particular.

Examples of phenol resins include alkylphenol resins and alkyl polyhydric phenol resins, and are exemplified by those obtained by curing monomers or oligomers of alkyl phenols and alkyl polyhydric phenols or their mixtures. Curing can be effected, for example, by causing the above-mentioned monomers and the like to react with formaldehyde, so as to yield a resol, and polymerizing thus obtained resol, or by a method causing urushiol to react with water.

An example of the alkylphenol or alkyl polyhydric phenol is the compound represented by the following general formula (1):

[Chemical Formula 1]

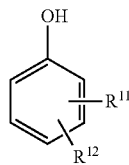

(1)

In the formula, $R^{11}$ and $R^{12}$ each indicate a hydroxyl or alkyl group, whereas at least one of $R^{11}$ and $R^{12}$ is an alkyl group. Preferred in particular is an alkyl polyhydric phenol having, with respect to the hydroxy group in the formula, a hydroxyl group at an ortho position and an alkyl group at a meta or para position.

Preferred as such an alkyl polyhydric phenol in general is a component contained in a lacquer paint, specific examples thereof include urushiol having —$CH_{17}H_{25}$ at the meta position, thitsiol having —$CH_{17}H_{33}$ at the para position, and laccol having —$CH_{17}H_{31}$ at the meta position.

The above-mentioned alkylphenol or alkyl polyhydric phenol can act as a reducing agent, so that the magnet body 13 is covered with a strong reducing atmosphere even when heat-treated at a high temperature for curing at the time of forming the outer protective layer 19 made of this resin, whereby the deterioration due to oxidation of the magnet body 13 can be decreased greatly.

Though the epoxy resin is not restricted in particular, employable examples thereof include epoxy compounds such as those of bisphenol type, polyol glycidyl ether type, polyacid glycidyl ester type, polyamine glycidylamine type, and alicyclic epoxy type. Preferably, in addition to the above-mentioned epoxy compound, the epoxy resin further contains a curing agent which can cure the epoxy compound. Examples of the curing agent include polyamines, epoxy-resin-added products of polyamines, polyamide amines, and polyamide resins, whereas specific examples include m-xylenediamine, isophoronediamine, diethylenetriamine, triethylenetetramine, and diaminodiphenylmethane.

The melamine resin is a resin formed by causing melamine(2,4,6-triamino-1,3,5-triazine) to react with formaldehyde, so as to yield methylolamine, and then curing it. Though such a melamine resin may form the outer protective layer 19 by itself, it will be more preferred if the melamine resin is used in combination with the above-mentioned phenol resin and epoxy resin.

Since the melamine resin can form many crosslinking structures in the phenol resin or epoxy resin, the outer protective layer 19 containing them in combination is extremely excellent in heat resistance and strength. As a result, the corrosion resistance and heat resistance of the rare-earth magnet 10 further improve.

The outer protective layer containing the phenol resin, epoxy resin, or melamine resin can be formed, for example, by dissolving or dispersing such a resin into a solvent, so as to yield a solution or varnish, applying it onto the surface of the inner protective layer 18, drying it and so forth as appropriate, and then curing the resin by heating or the like.

(3) Metal Salt Layer

The metal salt layer acting as the outer protective layer 19 is formed so as to cover the inner protective layer 18 (second layer 17), and is mainly constructed by a metal salt.

It will be preferred in particular if the outer protective layer 19 constructed by the metal salt is a chemical conversion layer formed by chemical conversion treatment of the magnet body 13 formed with the inner protective layer 18. Such a chemical conversion layer has a form in which a number of small planar crystals made of the metal salt are attached to the inner protective layer 18 (second layer 17) so as to cover it, for example.

Examples of the metal salt constructing the metal salt layer (chemical conversion layer) include those containing at least one species of metal element selected from the group consisting of Cr, Ce, Mo, W, Mn, Mg, Zn, Si, Zr, V, Ti, and Fe, whereas preferred are those containing these elements and at least one species of element selected from the group consisting of P, O, C, and S. Specifically, phosphates or sulfates of the above-mentioned metal elements are preferred, and the phosphates are more preferred.

In particular, those containing at least one species of metal element selected from the group consisting of Mo, Ce, Mg, Zr, Mn, and W and at least one species of element selected from the group consisting of P, O, C, and S are preferred, phosphates or sulfates of the above-mentioned metal elements are more preferred, and the phosphates are preferred in particular.

As mentioned above, the metal salt layer (chemical conversion layer) can favorably be formed by chemical conversion treatment of the surface of the magnet body 13 formed with the inner protective layer 18. First, for chemical conversion treatment, the surface of the magnet body 13 formed with the inner protective layer 18 is washed with an alkali degreasing agent or the like. Subsequently, the magnet body 13 is dipped in a chemical conversion solution and so forth, so as to be subjected to chemical conversion treatment, thus forming a chemical conversion layer on the surface of the second layer 17.

Examples of the chemical conversion solution include aqueous solutions containing a metal and an acid ion which constitute the above-mentioned metal salt. When forming a chemical conversion layer made of a phosphate of the above-mentioned metal as a metal salt layer, for example, a chemical conversion solution containing a metal material, phosphoric acid, and an oxidizing agent can be used.

More specifically, employable as the chemical conversion solution when forming a metal salt layer (chemical conversion layer) made of molybdenum phosphate is one containing a molybdate such as sodium molybdate or molybdic acid as a metal material in combination with phosphoric acid and an oxidizing agent.

Employable as the chemical conversion solution when forming a metal salt layer made of cerium phosphate is one containing a cerium salt such as cerium nitrate as a metal material in combination with phosphoric acid and an oxidizing agent. Examples of the oxidizing agent contained in the chemical conversion solution include sodium nitrite, sodium nitrate, potassium permanganate, sodium chromate, and hydrogen peroxide.

Though the chemical conversion solution temperature at the time of chemical conversion treatment is not limited in particular, it will be preferred from the viewpoint of promoting a reaction between the magnet body 13 and the chemical conversion solution so as to form the metal salt layer (chemical conversion layer) in a short time if the chemical conversion solution is used while being heated to room temperature or higher. The temperature of the chemical conversion solution is preferably 30 to 100° C., for example. Though not restricted in particular, the time (chemical conversion treatment time) for dipping the magnet body 13 in the chemical conversion solution is preferably 1 to 60 min, more preferably 2 to 30 min. When the chemical conversion treatment time is less than 1 min, the state of formation of the chemical conversion layer tends to become uneven. When the chemical conversion treatment time exceeds 60 min, the chemical conversion layer becomes so thick that it becomes less dense, whereby the resulting rare-earth magnet 10 may deteriorate its corrosion resistance and the like.

Preferably, after the chemical conversion treatment, the surface of the resulting rare-earth magnet 10 is washed with water, so as to sufficiently remove the chemical conversion solution and the like remaining on the surface, and then the rare-earth magnet 10 is fully dried by heating or the like. When the drying is insufficient, the moisture attached to the surface may cause corrosion in the rare-earth magnet 10. However, it will be preferred if the heating temperature at the time of drying is such that characteristics of the rare-earth magnet 10 are not deteriorated thereby.

When performed for a support containing a metal element, the above-mentioned chemical conversion treatment usually advances as the metal element in the support dissolves, thereby forming a stable chemical conversion layer. When directly forming a chemical conversion layer on the surface of a magnet body such as one based on R-TM-B, a rare-earth-rich phase in the above-mentioned magnet body is selectively dissolved, whereby there has conventionally been a tendency of the chemical conversion layer to be formed insufficiently. However, such selective dissolution of the rare-earth-rich phase is very hard to occur in the above-mentioned embodiment, since the chemical conversion treatment is performed after the inner protective layer 18 is formed on the surface of the magnet body 13 containing a rare-earth element. Thus, a stable metal salt layer (chemical conversion layer) is formed on the outermost layer of the rare-earth magnet 10 in this embodiment.

(4) Layer Containing an Organic-Inorganic Hybrid Compound

The outer protective layer 19 containing an organic-inorganic hybrid compound is formed so as to cover the inner protective layer 18 (second layer 17).

The organic-inorganic hybrid compound contained in the organic-inorganic hybrid layer is a compound containing a structural unit made of an organic polymer and a structural unit made of an inorganic polymer. In the following, the "structural unit made of an organic polymer" and "structural unit made of an inorganic polymer" will be referred to as "organic structural unit" and "inorganic structural unit", respectively, if necessary for convenience of explanation.

An example of the organic structural unit is a polymer structure having a main chain constructed by bonding carbon atoms to each other. A part of the main chain may include an atom other than carbon, e.g., oxygen atom or nitrogen atom. Such an organic structural unit is not restricted in particular as long as it is a polymer structure formed from an organic compound, examples of which include polymer structures of organic compounds formed by various polymerization reactions such as addition polymerization, polycondensation, and polyaddition. Preferred among them are vinyl polymer structures formed from vinyl-containing monomers and epoxy polymer structures obtained from epoxy-containing monomers.

An example of the inorganic structural unit is a polymer structure having a main chain constructed by an element other than carbon atoms. Preferably, this main chain contains a metal atom as an element other than carbon and has a structure in which metal atoms and oxygen atoms are bonded alternately. Preferred as the metal atom in the main chain of the inorganic structural unit is Si, Al, Ti, Zr, Ta, Mo, Nb, or B.

Among them, polymer structures having a main chain containing an —Si—O— bond such as polysiloxane structures in particular are preferred in particular as polymer structures constructing the main chain in the organic structural unit, since they can be synthesized relatively easily and can form polymers having various structures. Preferred in particular as the polymer structure having the main chain including the —Si—O— bond is a polymer structure obtained by condensing or cocondensing a compound represented by the following formula (2) and/or its hydrolysate. Since the inorganic structural unit made of such a polymer structure is excellent in stress relaxation, the protective layer containing the organic-inorganic hybrid compound including this structure is harder to generate cracks and the like.

[Chemical Formula 2]

$$R^{21}{}_m Si(OR^{22})_{4-m} \quad (2)$$

In the above-mentioned formula, $R^{21}$ is an organic group having a carbon number of 1 to 8, $R^{22}$ is an alkyl group having a carbon number of 1 to 5 or an acyl group having a carbon number of 1 to 4, and m is 1 or 2. When a plurality of $R^{21}$ or $R^{22}$ exist, they may be identical to or different from each other.

Examples of the organic-inorganic hybrid compounds include compounds in which organic and inorganic structural units are combined together by covalent bonds, compounds in which organic and inorganic structural units are combined together by hydrogen bonds, and compounds in which an organic structural unit having an aromatic ring and an inorganic structural unit having an aromatic ring are combined together by an interaction between the aromatic rings. These organic-inorganic hybrid compounds will now be explained individually.

First, an organic-inorganic hybrid compound in which organic and inorganic structural units are combined together by a covalent bond will be explained.

The covalent bond between the organic and inorganic structural units is mainly a bond between a carbon atom in the organic structural unit and a metal atom in the inorganic structural unit. This covalent bond may be one in which the above-mentioned carbon and metal atoms are directly combined to each other or one in which the carbon and metal atoms are combined to each other through another element. In the latter case, only a covalent bond is formed between the carbon atom and the metal element. Preferred in particular as the covalent bond in the organic-inorganic hybrid compound is the former one in which the carbon and metal atoms are directly combined to each other.

Such an organic-inorganic hybrid compound can be formed by the following method, for example. Namely, an example of the method prepares an organic polymer compound and an inorganic compound which have respective functional groups condensable to each other, and causes a condensation reaction between the organic polymer compound and inorganic compound, while generating a condensation reaction in the inorganic compound, so as to form a polymer, thereby yielding an organic-inorganic hybrid compound having an organic structural unit and an inorganic structural unit.

Examples of combinations of condensable functional groups in the organic polymer compound and inorganic compound in such a manufacturing method include combinations of hydroxyl and alkoxy groups and combinations of hydroxyl groups. Both may have alkoxy groups. In this case, forming a hydroxyl group by hydrolyzing one alkoxy group can generate the above-mentioned condensation.

When the organic polymer compound partly has a functional group represented by -$M^1$-OR (where $M^1$ is a metal element), while the inorganic compound has a functional group represented by -$M^2$-OR, their hydrolysis-condensation reaction generates a bond represented by -$M^1$-O-$M^2$-. Also, functional groups represented by -$M^2$-OR in the inorganic compound cause a condensation reaction, thereby forming an inorganic structural unit. As a result, an organic-inorganic hybrid compound in which the organic and inorganic structural units are combined together by a covalent bond is obtained. In view of easiness in the condensation reaction, availability, and so forth, Si is preferred in particular as metal elements represented by $M^1$ and $M^2$.

The outer protective layer 19 containing such an organic-inorganic hybrid compound can be formed, for example, by preparing a solution containing the above-mentioned organic polymer compound and inorganic compound, applying it onto the surface of the inner protective layer 18, and then heating it or leaving it in the air, so as to cause a polymerization reaction (e.g., condensation reaction) of the inorganic compound. The outer protective layer 19 may also be formed by making an organic-inorganic hybrid compound beforehand, and applying it onto the surface of the inner protective layer 18.

The organic-inorganic hybrid compound in which a structural unit made of an organic polymer and a structural unit made of an inorganic polymer are combined together by a hydrogen bond will now be explained.

Here, the "hydrogen bond" refers to a bond formed by hydrogen interposed between two atoms, which is represented by X—H—Y in general. X and Y represent two atoms combined to each other by the hydrogen bond, whereas X—H indicates the covalent bond between the X atom and hydrogen. Namely, the hydrogen bond is formed between the group represented by X—H and the Y atom. From such a viewpoint, this organic-inorganic hybrid compound can be regarded as one in which organic and inorganic polymers, which are respective molecules different from each other, are combined together by a hydrogen bond.

For forming a hydrogen bond, the organic and inorganic structural units have functional groups which can form a hydrogen bond with each other in their molecules. Here, an example of functional groups which can form a hydrogen bond includes a combination of a proton-donating functional group (group represented by the above-mentioned X—H) which donates hydrogen in the hydrogen bond and a proton-accepting functional group (group containing the above-mentioned Y) which accepts hydrogen in the hydrogen bond.

Though the organic and inorganic structural units may each have either the proton-donating or proton-accepting functional group, it will be preferred if the organic and inorganic structural units have proton-accepting and proton-donating functional groups, respectively.

Examples of the proton-accepting functional group in the organic structural unit include functional groups having strongly electronegative oxygen atoms, nitrogen atoms, fluorine atoms, chlorine atoms, and the like. Specifically, amido, imido, carbonate, and urethane groups are preferred. Amido group is preferred in particular, since it can exhibit a high proton acceptability when forming a hydrogen bond. Specific examples of such an organic structural unit (organic polymer) include polyvinylpyrrolidone, polyoxazoline, polyacrylamide derivatives, poly(N-vinylcaprolactone), polyvinylacetamide, and nylon derivatives.

Examples of the proton-donating functional group in the inorganic structural unit include functional groups having structures represented by —OH and —NH. Specific examples of functional groups having such structures include hydroxyl and amino groups. Among them, the hydroxyl group is preferred in particular, since it can favorably form a hydrogen bond with the above-mentioned proton-accepting functional group.

Preferred as such an inorganic structural unit is a polymer structure obtained by condensing or cocondensing a compound represented by the above-mentioned formula (2) and/or its hydrolysate, while a hydroxyl group generated by hydrolyzing an alkoxy group represented by —$OR^{22}$ in the above-mentioned condensation or cocondensation reaction exists in the structure. This yields polysiloxane, whose main chain is constructed by —Si—O— bond, having a hydroxyl group which is a proton-donating functional group.

Whether a hydrogen bond is formed between the organic and inorganic structural units or not can be verified by a Fourier-transform infrared spectrometer (FT-IR), for example. Specifically, when a hydrogen bond is formed, the functional group contributing to the hydrogen bond usually exhibits absorption at a position shifted from an absorption wave number obtained in the state not contributing to the hydrogen bond in the case where a peeled piece of the outer protective layer 19 is analyzed by FT-IR.

Such an organic-inorganic hybrid compound is formed, for example, by a method preparing an organic polymer compound having a proton-accepting functional group and an inorganic compound having a proton-donating functional group, mixing them, and then causing polymerization of the inorganic compound, so as to yield an organic-inorganic hybrid compound having organic and inorganic structural units. In this case, the inorganic compound may be one having a functional group such as the above-mentioned alkoxy group which becomes a proton-donating functional group after a reaction such as hydrolysis.

Examples of the organic polymer compound used in this manufacturing method include polyvinylpyrrolidone, polyoxazoline, polyacrylamide derivatives, poly(N-vinylcaprolactone), polyvinylacetamide, and nylon derivatives which can form the above-mentioned organic structural unit. An example of the inorganic compound is the compound represented by the above-mentioned general formula (1).

The outer protective layer 19 containing such an organic-inorganic hybrid compound can be formed, for example, by preparing a solution containing the above-mentioned organic polymer compound and inorganic compound, applying it onto the surface of the inner protective layer 18, and then heating it or leaving it in the air, so as to cause a polymerization reaction (e.g., condensation reaction) of the inorganic compound. The outer protective layer 19 may also be formed by making an organic-inorganic hybrid compound beforehand, and applying it onto the surface of the inner protective layer 18.

An organic-inorganic hybrid compound in which an organic structural unit having an aromatic ring and an inorganic structural unit having an aromatic ring are combined together by an interaction between the aromatic rings will now be explained.

The aromatic ring is a generic term of rings belonging to aromatic series, and refers to a thermodynamically stable annular structure in which π-electrons are delocalized, such as benzene ring, condensed benzene rings, non-benzene aromatic rings, and heterocyclic aromatic rings, for example. Among them, the benzene ring is preferred as an aromatic ring in the organic and inorganic structural units.

This organic-inorganic hybrid compound is one in which the organic and inorganic structural units are weakly combined together by an interaction of π-electrons in the respective aromatic rings (π-π interaction). From such a viewpoint, this organic-inorganic hybrid compound can be regarded as one in which organic and inorganic polymers which are molecules separate from each other are combined together by the π-π interaction.

The organic structural unit (organic polymer) having such an aromatic ring may have the aromatic ring in either its main or side chain, and can employ both of thermoplastic and thermosetting organic polymers. Examples of the thermoplastic organic polymer include polystyrene, polyester, polyphenylene ether, polysulfone, polyethersulfone, polyphthalamide, polyphenylenesulfide, polyallylate, polyimide, polyamideimide, and polyetherimide. Examples of the thermosetting organic polymer compound include phenol, epoxy, acrylic, melamine, alkyd, and urea resins having at least one aromatic ring in a repeating structural unit.

The inorganic structural unit (inorganic polymer) having an aromatic ring may have the aromatic ring in either its main or side chain, a preferred example of which is a polymer structure obtained by condensing or cocondensing a compound represented by the above-mentioned formula (2) and/or its hydrolysate, while at least one group represented by $R^{21}$ is a group having an aromatic ring. It will be preferred if this aromatic ring is introduced as the form of benzyl, β-phenethyl, p-toluoyl, mesityl, p-stynyl, or phenyl group in the compound of the above-mentioned formula (2).

The outer protective layer 19 containing such an organic-inorganic hybrid compound can be formed, for example, by preparing a solution containing the above-mentioned organic polymer compound and inorganic compound, applying it onto the surface of the inner protective layer 18, and then heating it or leaving it in the air, so as to cause a polymerization reaction (e.g., condensation reaction) of the inorganic compound. The outer protective layer 19 may also be formed by making an organic-inorganic hybrid compound beforehand, and applying it onto the surface of the inner protective layer 18.

Inorganic Additive

The outer protective layer 19, which is any of the above-mentioned oxide layer, resin layer, metal salt layer, or layer containing an organic-inorganic hybrid compound, may further contain inorganic additives in addition to these constituent materials. The outer protective layer 19 thus containing an inorganic additive attains a more excellent heat resistance, and also becomes excellent in terms of strength.

Such an inorganic additive is preferably an inorganic additive having a planar structure (planar inorganic additive), and is preferably insoluble to the above-mentioned organic-inorganic hybrid compounds and resins or solvents and the like used when forming the outer protective layer.

Examples of constituent materials for such an inorganic additive include talc, silica, titania, alumina, carbon black (CB), zinc oxide (ZnO), magnesium silicate (MgSiO), and barium sulfate ($BaSO_4$). The inorganic additive content in the outer protective layer 19 is preferably 1 to 30 mass % in the total mass of the outer protective layer 19.

While the rare-earth magnet 10 in accordance with a preferred embodiment and its manufacturing methods are explained in the foregoing, the inner protective layer 18 made of the first layer 16 and second layer 17 in the rare-earth magnet 10 having such a structure is formed by changing the surface of the magnet body 13, and thus initially has characteristics of having a dense structure and being excellent in adhesion to the magnet body 13. This can favorably lower influences of outside air such as moisture on the magnet body 13. The outer protective layer 19 covering the inner protective layer 18 is a stable layer separately provided on the surface of the magnet body 13 (second layer 17), and thus can exhibit an excellent heat resistance which is hard to be obtained by layers derived from the magnet body 13.

Though single-layer oxide layers obtained by oxidizing the surface of the magnet body, resin layers formed by coating or the like on the surface of the magnet body, and the like have conventionally been known as protective layers of rare-earth magnets, the single-layer oxide layer is harder to attain a sufficient corrosion resistance by itself, and the resin layer is harder to attain a sufficient heat resistance (such a heat resistance as to endure a temperature exceeding about 120° C.). By contrast, the rare-earth magnet 10 in accordance with the second embodiment is equipped with the protective layer 15 including the above-mentioned inner protective layer 18 and outer protective layer 19 and thus not only is superior to the rare-earth magnets equipped with the above-mentioned conventional protective layers, but also has such a heat resistance as to be able to endure a high temperature of about 200° C. required in the use of motors in hybrid cars and the like.

The rare-earth magnet of the second embodiment is not limited to that mentioned above, but may be modified as appropriate. For example, though the above-mentioned embodiment exemplifies the inner protective layer 18 by one having a two-layer structure comprising the first layer 16 and second layer 17, it is not restrictive, whereby the inner protective layer 18 may have a one-layer structure. An example of the one-layer inner protective layer 18 is an oxide layer formed by oxidizing the surface of the magnet body 13. An example of such an oxide layer is a layer containing a rare-earth element derived from a magnet body and/or a transition element and an oxygen atom.

EXAMPLES

In the following, the present invention will be explained in further detail with reference to Examples, which do not restrict the present invention.

Example A

Example 1A

An ingot having a composition of 14.7Nd-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 μm. Thus obtained fine powder was put into a die, and was molded in a magnetic field. Subsequently, it was sintered in vacuum, and then was heat-treated, so as to yield a sintered body. The resulting sintered body was cut into a size of 20 mm×10 mm×2 mm, and then was barrel-polished, so as to yield a magnet body processed into a practical form.

Next, thus obtained magnet body was dipped in a 2% aqueous $HNO_3$ solution, and then was ultrasonically washed with water.

The magnet body subjected to pickling (acid treatment) as mentioned above was heat-treated for 10 minutes at 450° C. in an nitrogen atmosphere with a steam partial pressure of 475 hPa, so as to form a protective layer, thereby yielding a rare-earth magnet.

Figure 5:
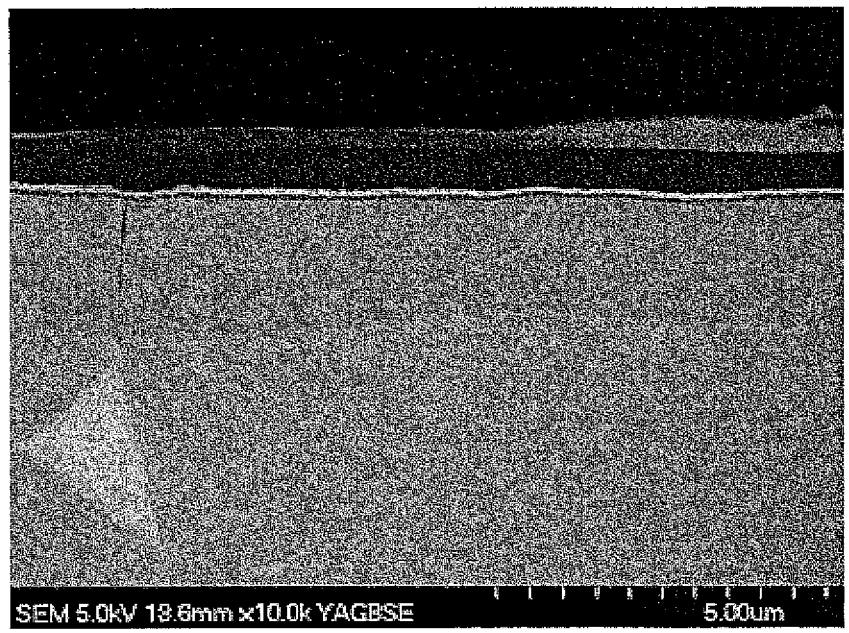
FIG. 5 An electron micrograph of the rare-earth magnet in accordance with Example 1A.

Using a focused ion beam processing machine, a processed cross section was made at a fractured surface of the rare-earth magnet in which the protective layer was formed on the surface of the magnet body as mentioned above, and the film structure near the surface was observed with a scanning electron microscope. Employed as the scanning electron microscope was S-4700 manufactured by Hitachi, Ltd. FIG. 5 shows thus obtained electron micrograph, whereas FIG. 6 is a photograph partly enlarging the electron micrograph of FIG. 5.

Figure 6:
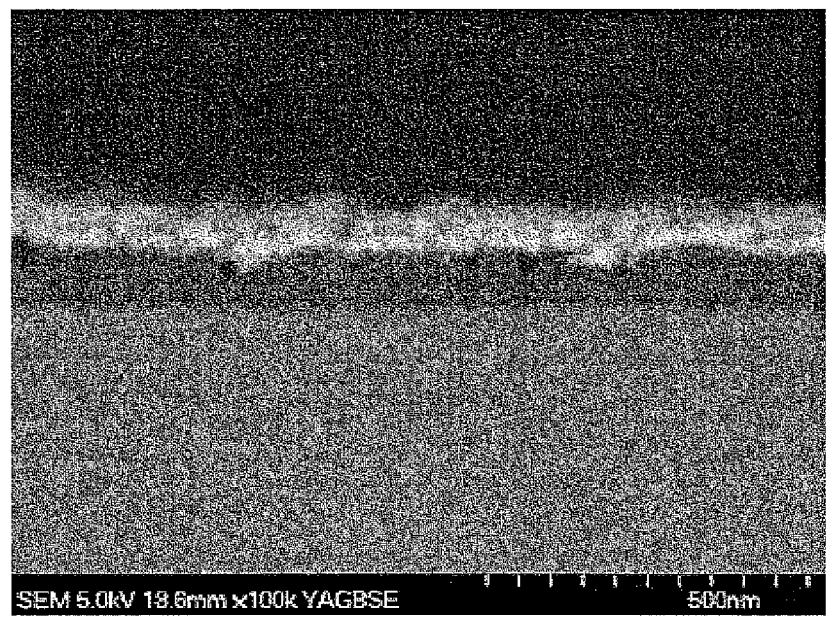
FIG. 6 An electron micrograph enlarging a part of FIG. 5.

It was verified in FIGS. 5 and 6 that the white layer was a platinum-palladium film for analysis, whereas a second layer having an average thickness of 100 nm was formed on the uppermost surface of the rare-earth magnet on the lower side of the white layer. It was also verified that a first layer having an average thickness of 3 μm was formed on the lower side of the second layer. Also, as can be seen from FIG. 5, it was verified that the first layer was formed on the magnet body, whereas the second layer was formed on the first layer.

Next, this rare-earth magnet was processed into a thin piece by using the focused ion beam processing machine, the film structure near the surface was observed with a transmission electron microscope (JEM-3010 manufactured by JEOL Ltd.), and elements contained in the first and second layers were analyzed by EDS (Voyager III manufactured by Noran Instruments Inc.). As a result, Nd, Fe, and O were detected as main components from the first layer, whereas no Nd was detected from the second layer although Fe and O were detected therefrom.

Also, thus obtained rare-earth magnet was subjected to a pressure cooker test. The test condition was such that the rare-earth magnet was left for 100 hr in an environment at 120° C., 0.2 MPa, and 100% RH. As a result, no changes due to the test were seen in appearance, and no changes in magnetic flux were observed between before and after the test.

Thus obtained rare-earth magnet was magnetized, and then was subjected to a test (ATF immersion test) in which it was dipped in a commercially-available automatic transmission fluid (ATF) for hybrid cars having 0.2% of water added thereto, and left therein for 1000 hr at 150° C. The tested magnet was magnetized again, and its magnetic flux was measured, whereby a deterioration of 1.0% was seen in magnetic flux as compared with that prior to the test.

Example 2A

A rare-earth magnet having a protective layer was manufactured as in Example 1A except that the heat treatment was performed for 13 min at 350° C. in an oxidizing atmosphere with an oxygen concentration of 7%.

When thus obtained rare-earth magnet was observed as in Example 1A, it was verified that a protective layer comprising a first layer having an average thickness of 0.9 μm and a second layer having an average thickness of 60 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.2%, which was very small.

Example 3A

A rare-earth magnet having a protective layer was manufactured as in Example 1A except that the heat treatment was performed for 7 min at 390° C. in an oxidizing atmosphere with an oxygen concentration of 7%.

When thus obtained rare-earth magnet was observed as in Example 1A, it was verified that a protective layer comprising a first layer having an average thickness of 1 μm and a second layer having an average thickness of 70 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.3%, which was very small.

Example 4A

A rare-earth magnet having a protective layer was manufactured as in Example 1A except that the heat treatment was performed for 10 min at 410° C. in an oxidizing atmosphere with an oxygen concentration of 0.5%.

When thus obtained rare-earth magnet was observed as in Example 1A, it was verified that a protective layer comprising a first layer having an average thickness of 1.5 μm and a second layer having an average thickness of 50 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.3%, which was very small.

Example 5A

A rare-earth magnet having a protective layer was manufactured as in Example 1A except that the heat treatment was performed for 10 min at 410° C. in an oxidizing atmosphere with an oxygen concentration of 21%.

When thus obtained rare-earth magnet was observed as in Example 1A, it was verified that a protective layer comprising a first layer having an average thickness of 2.1 μm and a second layer having an average thickness of 100 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.2%, which was very small.

Example 6A

A rare-earth magnet having a protective layer was manufactured as in Example 1A except that the heat treatment was performed for 10 min at 500° C. in an oxidizing atmosphere with an oxygen concentration of 7%.

When thus obtained rare-earth magnet was observed as in Example 1A, it was verified that a protective layer comprising a first layer having an average thickness of 5 μm and a second layer having an average thickness of 300 μm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.3%, which was very small.

Example 7A

A rare-earth magnet having a protective layer was manufactured as in Example 1A except that the heat treatment was performed for 10 min at 390° C. in an oxidizing atmosphere with an oxygen concentration of 0.5% and a steam partial pressure of 74 hPa.

When thus obtained rare-earth magnet was observed as in Example 1A, it was verified that a protective layer comprising a first layer having an average thickness of 1.7 μm and a second layer having an average thickness of 100 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.2%, which was very small.

Example 8A

A rare-earth magnet having a protective layer was manufactured as in Example 1A except that the heat treatment was performed for 10 min at 390° C. in an oxidizing atmosphere with an oxygen concentration of 0.5% and a steam partial pressure of 12 hPa.

When thus obtained rare-earth magnet was observed as in Example 1A, it was verified that a protective layer comprising a first layer having an average thickness of 1.4 μm and a second layer having an average thickness of 80 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.2%, which was very small.

Example 9A

A rare-earth magnet having a protective layer was manufactured as in Example 1A except that the heat treatment was performed for 10 min at 400° C. in an oxidizing atmosphere with a steam partial pressure of 2000 hPa.

When thus obtained rare-earth magnet was observed as in Example 1A, it was verified that a protective layer comprising a first layer having an average thickness of 1.8 μm and a second layer having an average thickness of 120 nm in this order was formed on the surface of the magnet body. When this protective layer was analyzed as in Example 1A, Nd, Fe, and O were detected as main components from the first layer, whereas no Nd was detected from the second layer although Fe and O were detected therefrom.

When thus obtained rare-earth magnet was subjected to a pressure cooker test as in Example 1A, it was verified that the deterioration in magnetic flux of the rare-earth magnet was 0.3%, which was very small.

Example 10A

A rare-earth magnet having a protective layer was manufactured as in Example 1A except that the heat treatment was performed for 10 min at 330° C. in an oxidizing atmosphere with an oxygen concentration of 7%.

The structure near the surface of thus obtained rare-earth magnet was analyzed by depth analysis according to Auger electron spectroscopy. For the electron spectroscopy, SAM680 manufactured by ULVAC-PHI, Inc. was used. As a result, it was verified that a second layer containing Fe and O with no Nd detected was formed by a depth of 16 nm from the surface, whereas a first layer containing Nd, Fe, and O was formed by 0.4 µm on the lower side of the second layer.

When thus obtained rare-earth magnet was subjected to a pressure cooker test as in Example 1A, it was verified that the deterioration in magnetic flux of the rare-earth magnet was 0.2%, which was very small.

Example 11A

A rare-earth magnet having a protective layer was manufactured as in Example 1A except that the heat treatment was performed for 10 min at 290° C. in an oxidizing atmosphere with an oxygen concentration of 21%.

The structure near the surface of thus obtained rare-earth magnet was analyzed by the same method as with Example 10A. As a result, it was verified that a second layer containing Fe and O with no Nd detected was formed by a depth of 10 nm from the surface, whereas a first layer containing Nd, Fe, and O was formed by 0.1 µm on the lower side of the second layer.

When thus obtained rare-earth magnet was subjected to a pressure cooker test as in Example 1A, it was verified that the deterioration in magnetic flux of the rare-earth magnet was 0.3%, which was very small.

Comparative Example 1A

A magnet body was made as in Example 1, and then was pickled with a 2% aqueous $HNO_3$ solution.

Figure 7:
FIG. 7 An electron micrograph of the rare-earth magnet in accordance with Comparative Example 1A.
Figure 8:
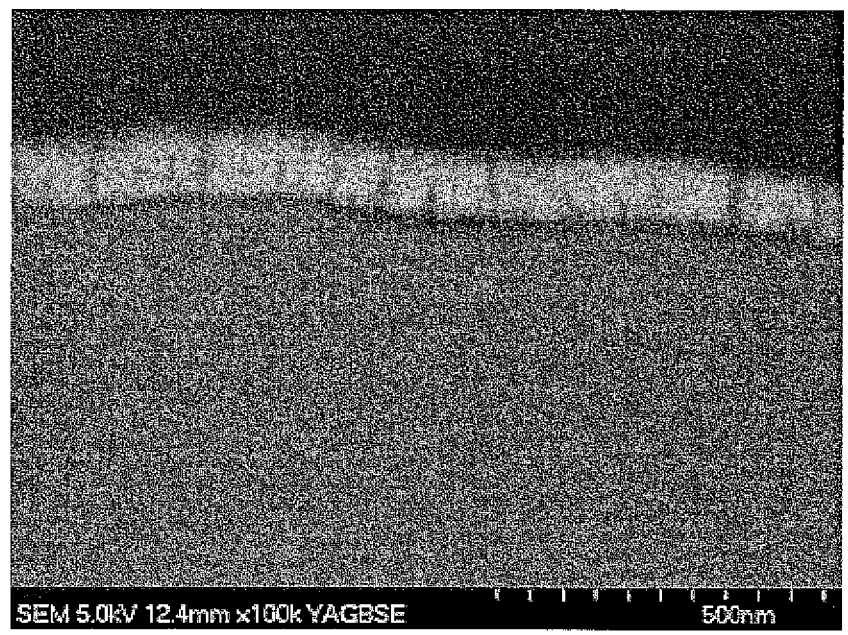
FIG. 8 An electron micrograph enlarging a part of FIG. 7.

This magnet body was observed with the scanning electron microscope as in Example 1A. FIG. 7 shows thus obtained electron micrograph, whereas FIG. 8 is a photograph partly enlarging the electron micrograph of FIG. 7. In FIGS. 7 and 8, the white layer was a platinum-palladium film for analysis, whereas a magnet body was seen on the lower side of the white layer.

Next, without effecting heat treatment in a steam atmosphere, thus obtained magnet body was subjected to the pressure cooker test as in Example 1A. As a result, its appearance changed from silver to black, and a deterioration of 2.1% in magnetic flux was seen.

Thus obtained magnet body was magnetized, and then was subjected to the ATF immersion test as in Example 1A. The tested magnet was magnetized again, and its magnetic flux was measured, whereby a deterioration of 7.5% in magnetic flux was seen in the magnet of Comparative Example 1A as compared with that prior to the test. Thus, while the magnet of Example 1A exhibited a deterioration of only 1.0% in magnetic flux between before and after the ATF immersion test, the magnet of Comparative Example 1A showed a deterioration of 7.5% in magnetic flux, whereby it was verified that this magnet exhibited a very large deterioration in magnetic flux between before and after the ATF immersion test.

Comparative Example 2A

A rare-earth magnet having a protective layer was manufactured as in Example 1A except that the heat treatment was performed for 10 min at 200° C. in an oxidizing atmosphere with an oxygen concentration of 7.0% and a steam partial pressure of 0.5 hPa.

When thus obtained rare-earth magnet was observed as in Example 1A, it was verified that a protective layer made of only a single layer having an average thickness of 20 nm was formed on the surface of the magnet body. When this protective layer was analyzed as in Example 1A, Nd, Fe, and O were detected as main components.

Thus obtained rare-earth magnet was subjected to the pressure cooker test as in Example 1A, whereby it was verified that the deterioration in magnetic flux of the rare-earth magnet was 0.4%.

Further, thus obtained magnet body was magnetized, and then was subjected to the ATF immersion test as in Example 1A. The tested magnet was magnetized again, and its magnetic flux was measured, whereby a deterioration of 4.7% in magnetic flux was seen in the magnet of Comparative Example 1A as compared with that prior to the test. Thus, while the magnet of Example 1A exhibited a deterioration of only 1.0% in magnetic flux between before and after the ATF immersion test, the magnet of Comparative Example 2A showed a deterioration of 4.7% in magnetic flux, whereby it was verified that this magnet exhibited a very large deterioration in magnetic flux between before and after the ATF immersion test.

Example B

Manufacture of Rare-Earth Magnet

Example 1B

An ingot having a composition of 13.2Nd-1.5Dy-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 µm. Thus obtained fine powder was put into a die, and was molded in a magnetic field. Subsequently, it was sintered in vacuum, and then was heat-treated, so as to yield a sintered body. The resulting sintered body was cut into a size of 35 mm×19 mm×6.5 mm, so as to yield a magnet body processed into a practical form.

Next, thus obtained magnet body was dipped in a 2% aqueous $HNO_3$ solution, and then was ultrasonically washed with water. Subsequently, the magnet body subjected to pickling (acid treatment) was heat-treated for 8 min at 450° C. in an oxygen-nitrogen mixed atmosphere with an oxygen partial pressure of 70 hPa (oxygen concentration of 7%).

Thereafter, the magnet body was fixed within a vacuum film-forming chamber, which was evacuated until its degree of vacuum became $1\times10^{-3}$ Pa or less. Subsequently, using vacuum deposition, which is a vapor-phase growth method, an oxide layer made of aluminum oxide (alumina) was formed on the magnet body surface such as to yield a thickness of 5 µm.

Specifically, this oxide layer was formed by irradiating aluminum oxide particles (having a particle size of about 2 to 3 mm) with an electron beam, so as to melt and evaporate them at the same time. The applied voltage and current value at the time of generating the electron beam were 5 kV and 200 mA, respectively. During when forming the oxide layer, an oxygen gas was circulated at a flow rate of 1.0 sccm within the vacuum film-forming chamber, while the pressure within the chamber was maintained at $1\times10^{-2}$ Pa. The surface temperature of the magnet body at this time was adjusted so as to become 200° C., and the film-forming rate of 0.4 nm/sec was maintained. Thus, a rare-earth magnet of Example 1 was obtained.

Thus obtained rare-earth magnet was processed into a thin piece by using a focused ion beam processing machine, and the film structure near its surface was observed with a transmission electron microscope (JEM-3010 manufactured by JEOL Ltd.), whereby it was verified that two layers composed of a layer having an average thickness of 1 μm and a layer having an average thickness of 50 nm were formed between the magnet body and oxide layer on the surface of the magnet body successively from the magnet body side. When elements contained in these two layers were analyzed by EDS (Voyager III manufactured by Noran Instruments Inc.), Nd, Fe, and O were detected as main components from the layer on the magnet body side, whereas no Nd was detected from the layer on the oxide layer side although Fe and O were detected therefrom.

Example 2B

First, as in Example 1B, a magnet body was manufactured and then was pickled. Subsequently, this magnet body was heat-treated for 10 min at 390° C. in an oxidizing atmosphere at an oxygen concentration of 0.5% and a steam partial pressure of 74 hPa.

Next, this magnet body was placed in an atmospheric thermal CVD system. This atmospheric thermal CVD system is one which can form a metal oxide layer on a magnet body by introducing a metal alkoxide to become a deposition source and steam into a reaction furnace with a carrier gas such as nitrogen gas Then, $Mo(OC_2H_5)_5$, $Ti(O-i-C_3H_7)_4$, and water heated to 60° C. were employed as deposition sources and were fed by a carrier gas at 200 cm$^3$/min to the magnet body heated to 200° C. This formed a mixed oxide layer made of molybdenum oxide and titanium oxide having a thickness of 0.1 μm on the surface of the magnet body. Thus, a rare-earth magnet of Example 2B was obtained.

When thus obtained rare-earth magnet was observed with the transmission electron microscope as in Example 1B, it was verified that two layers composed of a layer having an average thickness of 1.7 μm and a layer having an average thickness of 100 nm were formed between the magnet body and oxide layer on the surface of the magnet body successively from the magnet body side. When elements contained in these two layers were analyzed by EDS, Nd, Fe, and O were detected as main components from the layer on the magnet body side, whereas no Nd was detected from the layer on the oxide layer side although Fe and O were detected therefrom. When the mixed oxide layer formed on the surface of the rare-earth magnet was subjected to fluorescent x-ray analysis, the metal ratio within the layer was composed of 3 atom % of Mo and 97 atom % of Ti.

Example 3B

First, as in Example 1B, a magnet body was manufactured and then was pickled. Further, this magnet body was heat-treated under the same condition as that in Example 1B.

Then, $Cr(C_5H_7O_2)_3$ and water heated to 60° C. were used as deposition sources and fed by a carrier gas at 200 cm$^3$/min to the magnet body heated to 200° C. This formed an oxide layer made of chromium oxide having a thickness of 0.3 μM on the surface of the magnet body. Thus, a rare-earth magnet of Example 3B was obtained.

When the semiconductor characteristic of the layer formed on the surface of the magnet body was investigated after the above-mentioned heat treatment in this manufacturing method, it was verified that this layer exhibited the n-type semiconductor characteristic. When the semiconductor characteristic of the oxide layer was similarly investigated, it was verified that this layer exhibited the p-type semiconductor characteristic.

When thus obtained rare-earth magnet was observed with the transmission electron microscope as in Example 1B, it was verified that two layers composed of a layer having an average thickness of 1 μm and a layer having an average thickness of 50 nm were formed between the magnet body and oxide layer on the surface of the magnet body successively from the magnet body side. When elements contained in these two layers were analyzed by EDS, Nd, Fe, and O were detected as main components from the layer on the magnet body side, whereas no Nd was detected from the layer on the oxide layer side although Fe and O were detected therefrom.

Reference Example 1B

An ingot having a composition of 13.2Nd-1.5Dy-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 μm. Thus obtained fine powder was put into a die, and was molded in a magnetic field. Subsequently, it was sintered in vacuum, and then was heat-treated, so as to yield a sintered body. The resulting sintered body was cut into a size of 35 mm×19 mm×6.5 mm, so as to yield a magnet body processed into a practical form.

Next, thus obtained magnet body was dipped in a 2% aqueous $HNO_3$ solution, and then was ultrasonically washed with water. Subsequently, the magnet body subjected to pickling (acid treatment) was heat-treated for 8 min at 450° C. in an oxygen-nitrogen mixed atmosphere with an oxygen partial pressure of 70 hPa (oxygen concentration of 7%). Thus, a rare-earth magnet of Reference Example 1B was obtained.

When thus obtained rare-earth magnet was observed with the transmission electron microscope as in Example 1B, it was verified that two layers composed of a layer having an average thickness of 1 μm and a layer having an average thickness of 50 nm were formed between the magnet body and oxide layer on the surface of the magnet body successively from the magnet body side. When elements contained in these two layers were analyzed by EDS, Nd, Fe, and O were detected as main components from the layer on the magnet body side, whereas no Nd was detected from the layer on the oxide layer side although Fe and O were detected therefrom.

Comparative Example 1B

First, as in Example 1B, a magnet body was manufactured, then dipped in a 2% aqueous $HNO_3$ solution, and thereafter ultrasonically washed with water. Subsequently, an acrylic resin paint was applied onto the surface of thus pickled (acid-treated) magnet body by a thickness of 10 μm, so as to form a protective layer. Thus, a rare-earth magnet of Comparative Example 1B was obtained.

Characteristic Evaluation
Salt Spray Test

The rare-earth magnets of Examples 1B to 3B, Reference Example 1B, and Comparative Example 1B were subjected to a salt spray test for 96 hr at 35° C. with 5% brine in conformity to JIS K5600-7-1. As a result, no rust was seen to occur in the rare-earth magnets of Examples 1B to 3B and Comparative Example 1B but in the rare-earth magnet of Reference Example 1B.

Heat Resistance Test

An immersion test in which the rare-earth magnets of Examples 1B to 3B, Reference Example 1B, and Comparative Example 1B were dipped in an ATF (automatic transmission fluid) manufactured by Nippon Oil Corporation at 200° C. for 1000 hr was performed. As a result, the deterioration in magnetic flux after the dipping was 0.2% or less in each of the rare-earth magnets of Examples 1B to 3B and Comparative Example 1B but 5.2% in the rare-earth magnet of Reference Example 1B.

The foregoing results of salt spray test and heat resistance test verified that the rare-earth magnets of Examples 1B to 3B were excellent in both characteristics of the corrosion resistance and heat resistance.

Example C

Example 1C

An ingot having a composition of 13.2Nd-1.5Dy-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 µm. Thus obtained fine powder was put into a die, and was molded in a magnetic field. Subsequently, it was sintered in vacuum, and then was heat-treated, so as to yield a sintered body. The resulting sintered body was cut into a size of 35 mm×19 mm×6.5 mm, so as to yield a magnet body processed into a practical form.

Next, thus obtained magnet body was dipped in a 2% aqueous $HNO_3$ solution, and then was ultrasonically washed with water.

The magnet body subjected to pickling (acid treatment) as mentioned above was heat-treated for 8 min at 450° C. in an oxygen-nitrogen mixed atmosphere with an oxygen partial pressure of 70 hPa (oxygen concentration of 7%), so as to form a protective layer.

Figure 9:
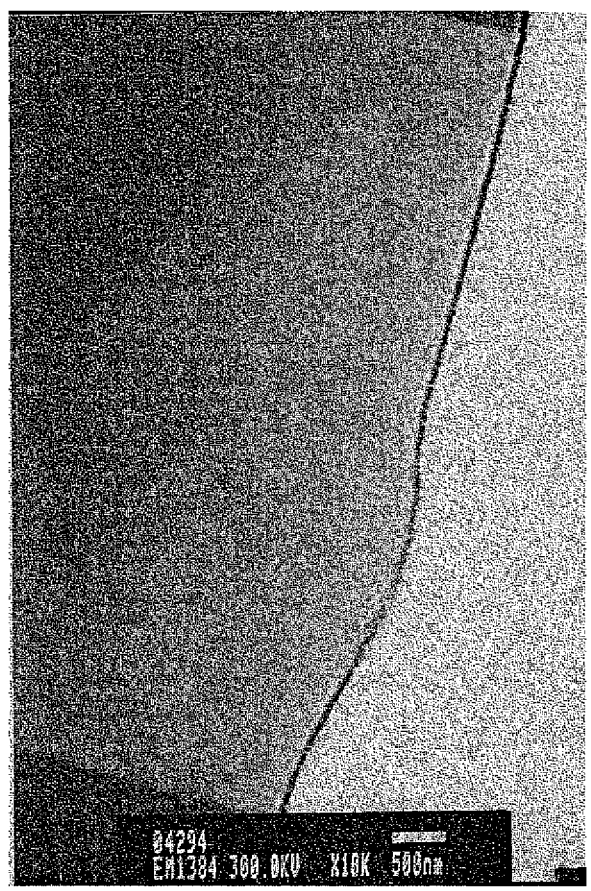
FIG. 9 An electron micrograph of the rare-earth magnet in accordance with Example 1C.

The rare-earth magnet in which the protective layer was formed on the surface of the magnet body as mentioned above was processed into a thin piece by using a focused ion beam processing machine, and the film structure near its surface was observed with a transmission electron microscope. JEM-3010 manufactured by JEOL Ltd. was employed as the transmission electron microscope. FIG. 9 shows thus obtained electron micrograph, whereas FIG. 10 shows a photograph partly enlarging the electron micrograph of FIG. 9.

Figure 10:
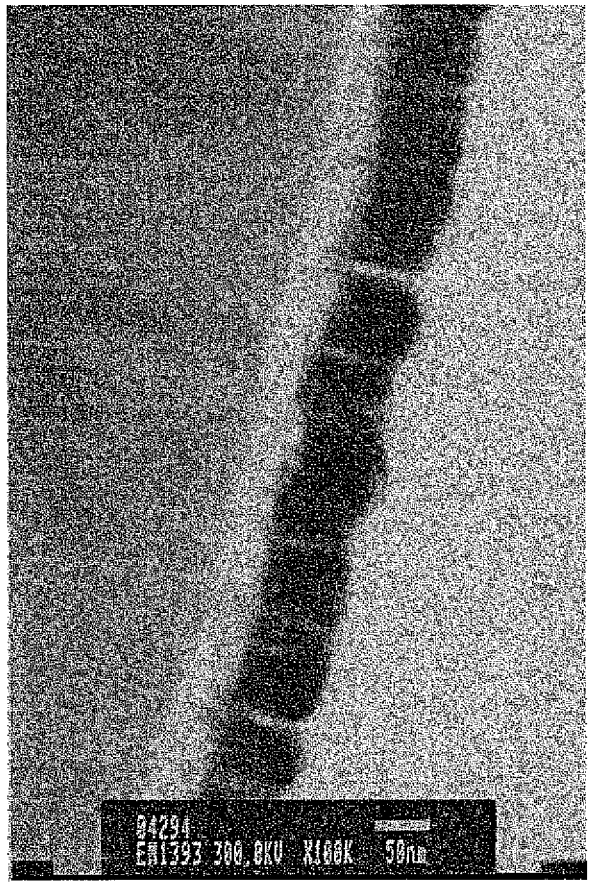
FIG. 10 An electron micrograph enlarging a part of FIG. 9.

It was verified in FIGS. 9 and 10 that the rightmost black layer was a platinum-palladium film, whereas the white layer adjacent thereto was a second layer containing no neodymium and having an average thickness of 50 nm in the protective layer of the rare-earth magnet. It was also verified that the gray layer (the layer gradually deepening its color from the white boundary to the magnet body) adjacent to the second layer was a first layer containing neodymium and having an average thickness of 1 µm. As can be seen from FIGS. 9 and 10, it was verified that the first layer was formed on the magnet body, whereas the second layer was formed on the first layer.

Further, the above-mentioned rare-earth magnet was processed into a thin piece by using the focused ion beam processing machine, the film structure near the surface was observed with a transmission electron microscope (JEM-3010 manufactured by JEOL Ltd.), and elements contained in the first and second layers were analyzed by EDS (Voyager III manufactured by Noran Instruments Inc.). As a result, Nd, Fe, and O were detected as main components from the first layer, whereas no Nd was detected from the second layer although Fe and O were detected therefrom.

The rare-earth magnet thus formed with the protective layer was further coated with a phenol resin paint by dip-spin coating, which was then heated for 20 min at 150° C. This process was repeated twice, so as to form a resin layer of about 3 µm, thereby yielding a rare-earth magnet of Example 1C.

Example 2C

As in Example 1C, a sintered body was made and cut into a size of 35 mm×19 mm×6.5 mm, so as to yield a magnet body processed into a practical form. Subsequently, as in Example 1C, pickling was effected, and heat treatment was performed, so as to form a protective layer. It was verified in thus obtained rare-earth magnet that the first layer was formed on the magnet body, whereas the second layer was formed on the first layer.

The rare-earth magnet thus formed with the protective layer was further coated with a phenol resin paint by spray coating, and was heated for 20 min at 150° C. Thus, a resin layer of about 5 µm was formed, whereby a rare-earth magnet of Example 2C was obtained.

Comparative Example 1C

Figure 11:
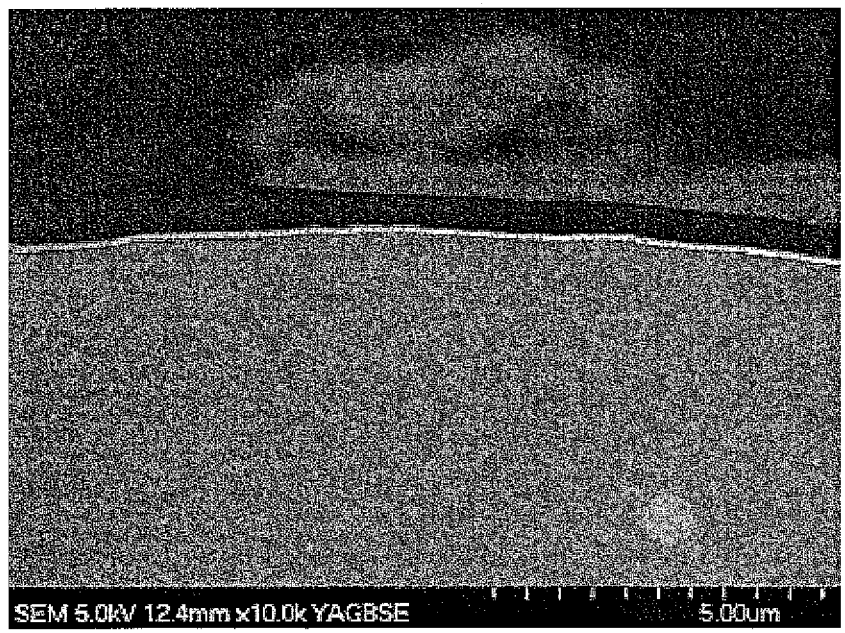
FIG. 11 An electron micrograph of the rare-earth magnet in accordance with Comparative Example 1C.
Figure 12:
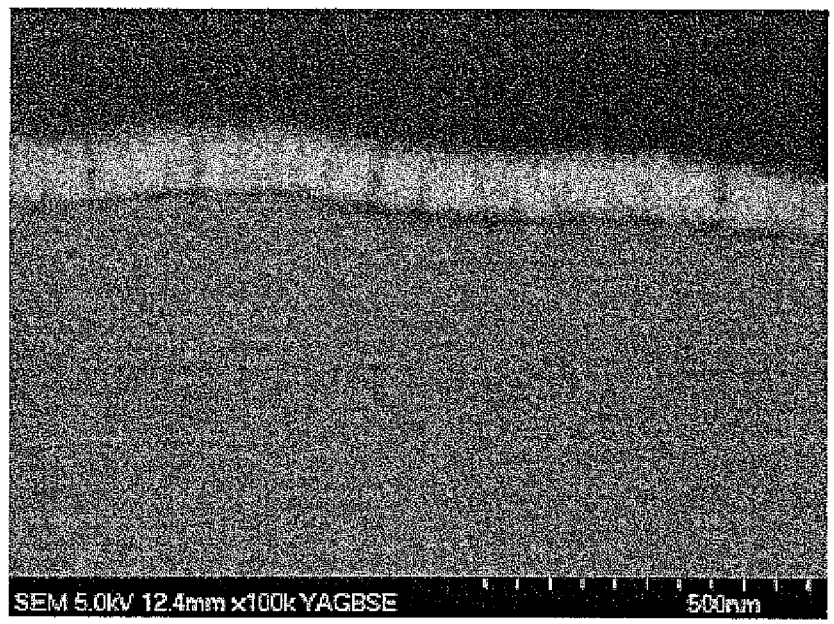
FIG. 12 An electron micrograph enlarging a part of FIG. 11.

As in Example 1C, a magnet body was made and pickled with a 2% aqueous $HNO_3$ solution, so as to yield a rare-earth magnet of Comparative Example 1C. A processed cross section was made in the magnet body by using a focused ion beam processing machine, and was observed with a scanning electron microscope (S-4700 manufactured by Hitachi, Ltd.). FIG. 11 shows thus obtained electron micrograph, whereas FIG. 12 is a photograph partly enlarging the electron micrograph of FIG. 11. In FIGS. 11 and 12, the white layer was a platinum-palladium film for analysis, whereas the magnet body was seen on the lower side of the white layer.

Reference Example 1C

As in Example 1C, a magnet body was made and pickled with a 2% aqueous $HNO_3$ solution. Subsequently, as in Example 1C, heat treatment was effected, and a protective layer was formed, whereby a rare-earth magnet of Reference Example 1C was obtained. The rare-earth magnet of Reference Example 1C was formed with no protective layer. The rare-earth magnet of Reference Example 1C was observed with the transmission electron microscope as in Example 1C. As a result, it was also verified in the rare-earth magnet of Reference Example 1C that the protective layer was constructed by a second layer having an average thickness of 50 nm formed on the outermost surface of the rare-earth magnet and a first layer having an average thickness of 1 µm formed on the lower side of the second layer.

Salt Spray Test

The rare-earth magnets of Examples 1C and 2C, Comparative Example 1C, and Reference Example 1C were subjected to a salt spray test for 96 hr at 35° C. with 5% brine in conformity to JIS K5600-7-1.

When the rare-earth magnet magnetic flux was measured in Examples 1C and 2C, Comparative Example 1C, and Reference Example 1C after the salt spray test, the magnet flux decreased from that prior to the test by 0.4% in Example 1C, 2.7% in Comparative Example 1C, and 2.0% in Reference Example 1C. No decrease in magnetic flux was seen in Example 2C.

Figure 13:
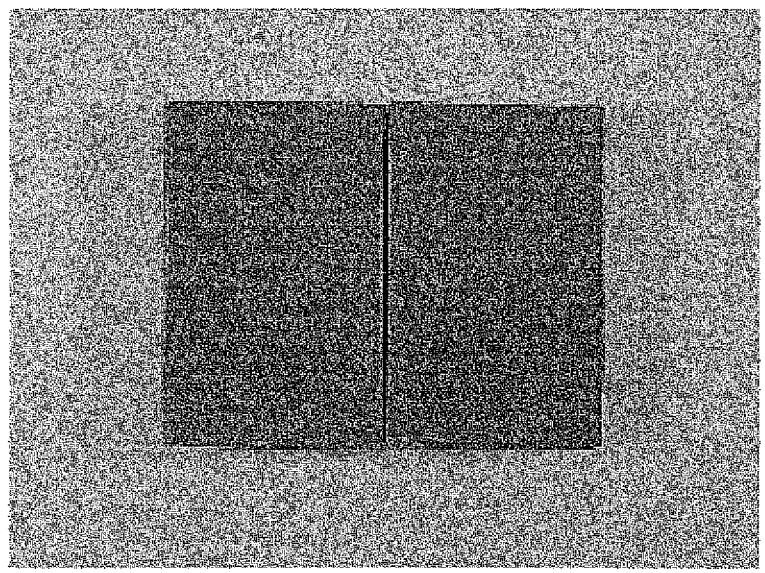
FIG. 13 An electron micrograph of the rare-earth magnet in accordance with Example 2C prior to a salt spray test.
Figure 14:
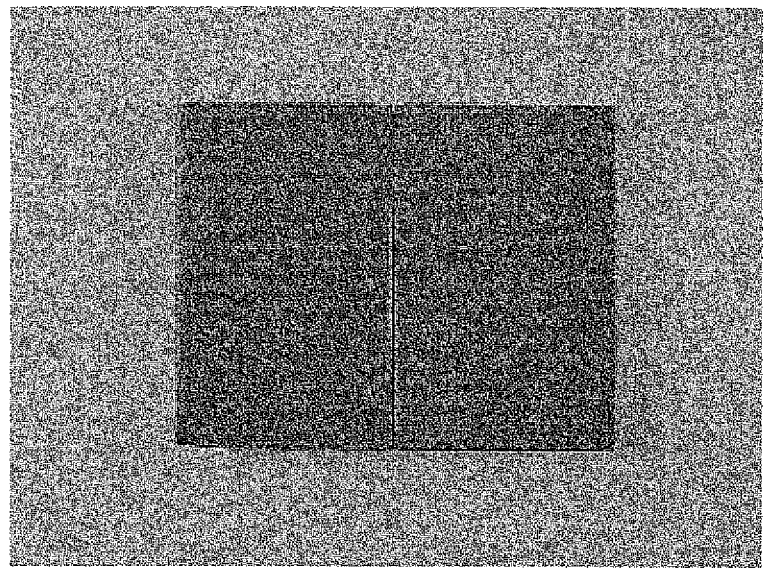
FIG. 14 An electron micrograph of the rare-earth magnet in accordance with Example 2C at 24 hr after starting the salt spray test.
Figure 15:
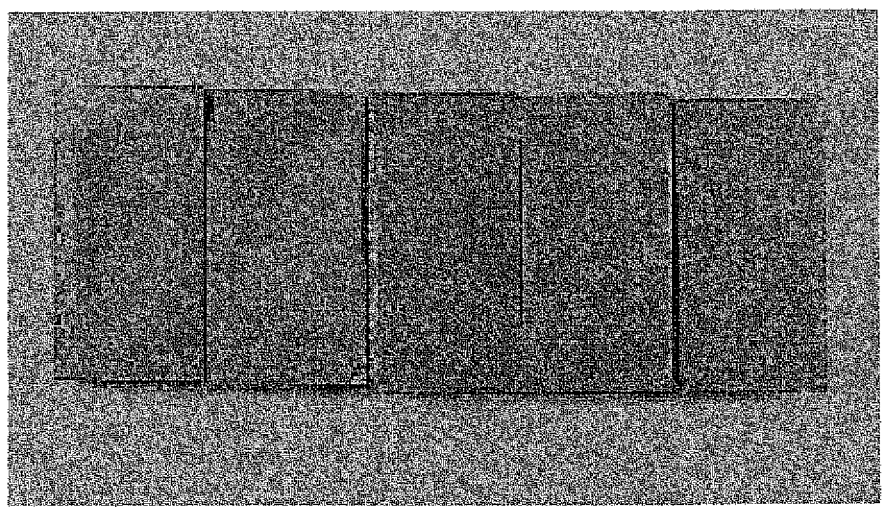
FIG. 15 An electron micrograph of the rare-earth magnet in accordance with Comparative Example 1C prior to the salt spray test.
Figure 16:
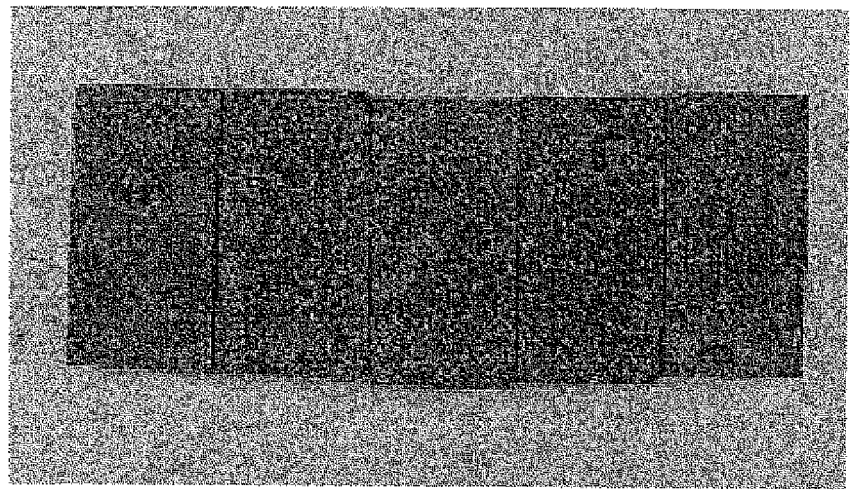
FIG. 16 An electron micrograph of the rare-earth magnet in accordance with Comparative Example 1C at 24 hr after starting the salt spray test.
Figure 17:
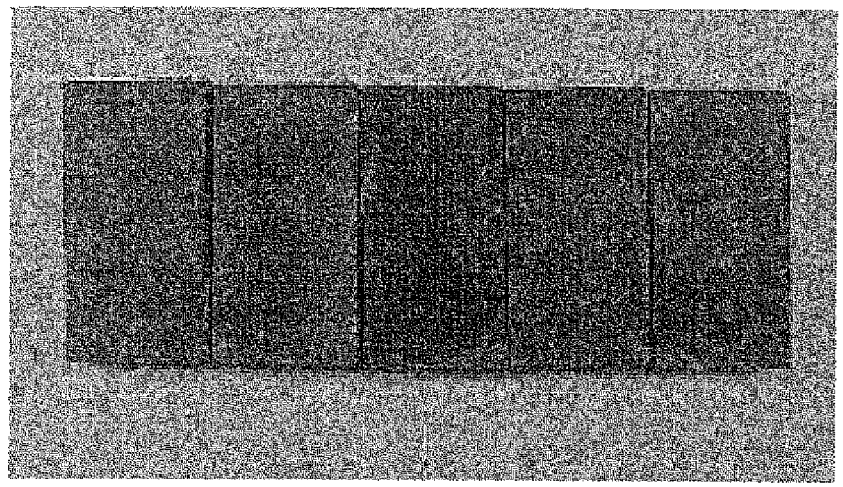
FIG. 17 An electron micrograph of the rare-earth magnet in accordance with Reference Example 1C prior to the salt spray test.
Figure 18:
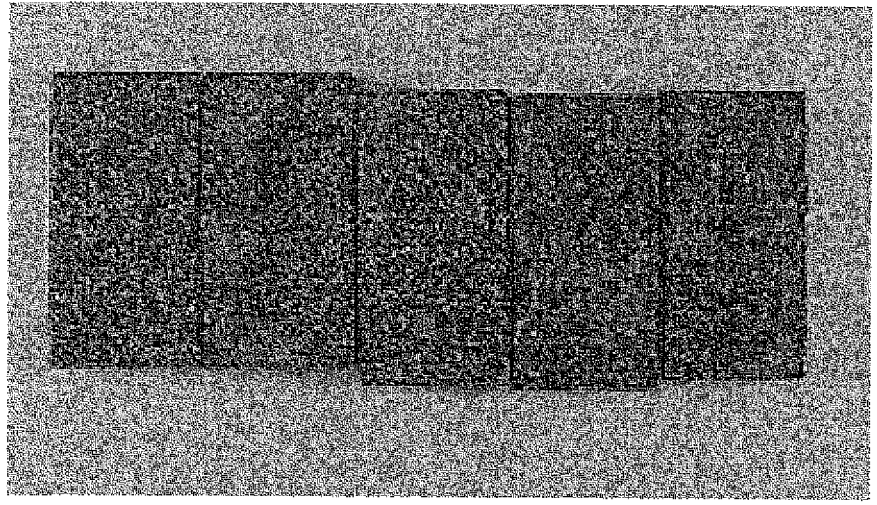
FIG. 18 An electron micrograph of the rare-earth magnet in accordance with Reference Example 1C at 24 hr after starting the salt spray test.

The state of occurrence of rust by the salt spray test was compared among the rare-earth magnets of Examples 1C and 2C, Comparative Example 1C, and Reference Example 1C. FIGS. 13, 15, and 17 show photographs of the rare-earth magnets in accordance with Example 2C, Comparative Example 1C, and Reference Example 1C, respectively, prior to the salt spray test. At 24 hr after starting the salt spray test, the occurrence of rust was partial and minor in Example 1C, whereas no rust was seen to occur in Example 2C. By contrast, the whole magnet was covered with rust in Comparative Example 1C and Reference Example 1C, in which the occurrence of rust was remarkable in Comparative Example 1C in particular. FIGS. 14, 16, and 18 show photographs of the rare-earth magnets in accordance with Example 2C, Comparative Example 1C, and Reference Example 1C, respectively, at 24 hr after starting the salt spray test.

The state of occurrence of rust was also compared among the rare-earth magnets at 96 hr after starting the salt spray test. As a result, rust occurred in Comparative Example 1C and Reference Example 1C too thick to peel off from the magnet surface, and could not be completely wiped off when tried, thereby remaining on the surface. In Example 1C, by contrast, though rust occurring and flowing from a part with an incomplete resin layer such as a corner of the magnet covered about a half of the magnet surface, the rust layer was removed when the rust was wiped off, whereby it was verified that the occurrence of rust was minor. When the cross section was observed, rust occurred by a thickness of about 50 µm from the magnet surface in Reference Example 1C. On the other hand, no rust was observed in the cross section in Example 1C. Also, no rust was seen to occur in Example 2C.

Pressure Cooker Test

The rare-earth magnets of Examples 1C and 2C were subjected to a pressure cooker test. The test condition was such that they were left for 100 hr in an environment at 120° C., 0.2 MPa, and 100% RH. As a result, in both of Examples 1C and 2C, no exterior changes such as the peeling of resin layers, swelling, and occurrence of rust by the test were seen, and no changes in magnetic flux was found between before and after the test.

Example D

Manufacture of Rare-Earth Magnet

Reference Example 1D

An ingot having a composition of 13.2Nd-1.5Dy-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 µm. Thus obtained fine powder was put into a die, and was molded in a magnetic field. Subsequently, it was sintered in vacuum, and then was heat-treated, so as to yield a sintered body. The resulting sintered body was cut into a size of 35 mm×19 mm×6.5 mm, so as to yield a magnet body processed into a practical form.

Next, thus obtained magnet body was dipped for 2 minute in a 2% aqueous $HNO_3$ solution, and then was ultrasonically washed with water. Subsequently, the magnet body subjected to pickling (acid treatment) was heat-treated for 8 min at 450° C. in an oxygen-nitrogen mixed atmosphere with an oxygen partial pressure of 70 hPa (oxygen concentration of 7%).

Thereafter, the heat-treated magnet body was dipped in a chemical conversion solution containing 0.1-M sodium molybdate, 1.0-M phosphoric acid, and 0.05-M sodium nitrite at 70° C. for 10 min, so as to perform chemical conversion treatment of the magnet body, thereby forming a chemical conversion layer on the surface.

Thus obtained rare-earth magnet was processed into a thin piece by using a focused ion beam processing machine, and the film structure near its surface was observed with a transmission electron microscope (JEM-3010 manufactured by JEOL Ltd.), whereby it was verified that two layers composed of a layer having an average thickness of 2.5 µm and a layer having an average thickness of 80 nm were formed between the magnet body and chemical conversion layer on the surface of the magnet body successively from the magnet body side. When elements contained in these two layers were analyzed by EDS (Voyager III manufactured by Noran Instruments Inc.), Nd, Fe, and O were detected as main components from the layer on the magnet body side, whereas no Nd was detected from the layer on the chemical conversion layer side although Fe and O were detected therefrom.

Example 2D

First, as in Example 1D, a magnet body was manufactured and then was pickled. Subsequently, heat treatment was performed for 8 min at 450° C. in an oxygen-nitrogen mixed atmosphere with an oxygen partial pressure of 70 hPa (oxygen concentration of 7%). Here, the structure near the surface of thus obtained rare-earth magnet was analyzed by depth analysis according to Auger electron spectroscopy. For the electron spectroscopy, SAM680 manufactured by ULVAC-PHI, Inc. was used. As a result, it was verified that a layer containing Fe and O with no Nd detected was formed by a depth of 80 nm from the surface, whereas a layer containing Nd, Fe, and O was formed by 2.5 µm on the lower side of the former layer.

Thereafter, the heat-treated magnet body was dipped in a chemical conversion solution containing 0.1-M cerium nitrate, 1.0-M phosphoric acid, and 0.05-M sodium nitrite at 80° C. for 10 min, so as to perform chemical conversion treatment of the magnet body, thereby forming a chemical conversion layer on the surface.

Reference Example 1D

As in Example 1D, a magnet body was formed, pickled, and then heat-treated. Thus obtained rare-earth magnet was employed as a rare-earth magnet of Reference Example 1D. When this rare-earth magnet was observed with the transmission electron microscope as in Example 1, it was verified that two layers composed of a layer having an average thickness of 2.5 µm and a layer having an average thickness of 80 nm were formed between the magnet body and oxide layer on the surface of the magnet body successively from the magnet body side. When elements contained in these two layers were analyzed by EDS, Nd, Fe, and O were detected as main components from the layer on the magnet body side, whereas no Nd was detected from the layer on the oxide layer side although Fe and O were detected therefrom.

[Characteristic Evaluation]

Salt Spray Test

The rare-earth magnets of Examples 1D and 2D and Reference Example 1D were subjected to a salt spray test in which 5% brine was sprayed for 96 hr at 35° C. in conformity to JIS K5600-7-1. As a result, no rust was seen to occur in the rare-earth magnets of Examples 1D and 2D but in the rare-earth magnet of Reference Example 1D.

Heat Resistance Test

An immersion test in which the rare-earth magnets of Examples 1D and 2D and Reference Example 1D were dipped in an ATF (automatic transmission fluid) manufactured by Nippon Oil Corporation at 200° C. for 1000 hr was performed. As a result, the deterioration in magnetic flux after the dipping was 0.2% or less in each of the rare-earth magnets of Examples 1D and 2D but 5.3% in the rare-earth magnet of Reference Example 1D.

The foregoing results of salt spray test and heat resistance test verified that the rare-earth magnets of Examples 1D and 2D were superior to the rare-earth magnet of Reference Example 1D in both characteristics of the corrosion resistance and heat resistance.

Example E

Manufacture of Rare-Earth Magnet

Example 1E

An ingot having a composition of 13.2Nd-1.5Dy-77.6Fe-1.6Co-6.1B (numbers indicating atom percent) was made by powder metallurgy, and then was roughly pulverized. Thereafter, jet mill pulverization with an inert gas was performed, so as to yield a fine powder having an average particle size of about 3.5 µm. Thus obtained fine powder was put into a die, and was molded in a magnetic field. Subsequently, it was sintered in vacuum, and then was heat-treated, so as to yield a sintered body. The resulting sintered body was cut into a size of 35 mm×19 mm×6.5 mm, so as to yield a magnet body processed into a practical form.

Next, thus obtained magnet body was dipped in a 2% aqueous $HNO_3$ solution, and then was ultrasonically washed with water.

Subsequently, the magnet body subjected to pickling (acid treatment) was heat-treated for 8 min at 450° C. in an oxygen-nitrogen mixed atmosphere with an oxygen partial pressure of 70 hPa (oxygen concentration of 7%), so as to form an inner protective layer on the surface of the magnet body.

Thereafter, a composition containing 40 parts by mass of xylene as a solvent and 60 parts by mass of a thermosetting alkyl phenol was prepared, applied onto the surface of the heat-treated magnet body, dried at normal temperature, and then cured by heating in the air at 150° C. for 30 min, so as to form an outer protective layer on the surface of the inner protective layer, thereby yielding a rare-earth magnet.

Thus obtained rare-earth magnet was processed into a thin piece by using a focused ion beam processing machine, and the film structure near its surface was observed with a transmission electron microscope (JEM-3010 manufactured by JEOL Ltd.), whereby it was verified that two layers composed of a layer having an average thickness of 1 µm and a layer having an average thickness of 50 nm were formed as the inner protective layer on the surface of the magnet body successively from the magnet body side. When elements contained in these two layers were analyzed by EDS (Voyager III manufactured by Noran Instruments Inc.), Nd, Fe, and O were detected as main components from the layer adjacent to the magnet body, whereas no Nd was detected from the layer remote from the magnet body although Fe and O were detected therefrom.

Example 2E

A rare-earth magnet was obtained as in Example 1E except that an alkyl polyhydric phenol (urushiol) was used in place of the thermosetting alkyl phenol.

When the film structure of thus obtained rare-earth magnet was observed as in Example 1E, it was verified that two layers composed of a layer having an average thickness of 1 µm and a layer having an average thickness of 50 nm were formed as the inner protective layer on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Example 3E

A rare-earth magnet was obtained as in Example 1E except that 30 mass % of an epoxy resin (Araldite) was further added as a material for forming the outer protective layer.

When the film structure of thus obtained rare-earth magnet was observed as in Example 1E, it was verified that two layers composed of a layer having an average thickness of 1 µm and a layer having an average thickness of 50 nm were formed as the inner protective layer on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Example 4E

First, as in Example 1E, a magnet body was manufactured, and then an inner protective layer was formed on the surface of the magnet body.

Separately from the above, 28 g of methyl methacrylate, 6 g of 2-ethylhexyl methacrylate, and 6 g of γ-methacryloxypropyltrimethoxysilane were added to 40 g of 2-propanol and mixed therewith, and then 1.6 g of 2,2'-azoisobutyronitrile were added to the resulting solution and caused to react therewith, so as to prepare a solution of an acrylic resin having a silyl group. When the molecular weight of this acrylic resin was measured by gel permeation chromatography, its weight-average molecular weight was about 10000 (calculated by an analytical curve using standard polystyrene).

Next, 80 g of methyltrimethoxysilane, 15 g of 2-propanol, and 17.5 g of 0.1% aqueous ammonia were further added to 40 g of the acrylic resin solution, and they were caused to react for 5 hr at 50° C., whereby a coating liquid containing an organic-inorganic hybrid compound in which the acrylic resin and a polymer of methyltrimethoxysilane were combined together was obtained.

Thereafter, this coating liquid was applied by dip coating onto the surface of the inner protective layer in the above-mentioned magnet body, and then was heated at 150° C. for 20 min, so as to form an outer protective layer made of the organic/inorganic hybrid compound, thereby yielding a rare-earth magnet.

When the film structure of thus obtained rare-earth magnet was observed as in Example 1E, it was verified that two layers composed of a layer having an average thickness of 1 μm and a layer having an average thickness of 50 nm were formed as the inner protective layer on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Example 5E

First, as in Example 1E, a magnet body was manufactured, and then an inner protective layer was formed on the surface of the magnet body.

Separately from the above, 20 g of polyvinylidone having a weight-average molecular weight of 40000 were dissolved in 2-propanol, 80 g of trimethyltrimethoxysilane and 17.5 g of 0.1% aqueous ammonia were added to the resulting solution, and then heat treatment was performed at 50° C. for 5 hr, so as to cause a polycondensation reaction of methyltrimethoxysilane, thereby preparing a coating liquid. The weight-average molecular weight was a value calculated with reference to an analysis curve using standard polystyrene after measurement by gel permeation chromatography.

Thereafter, this coating liquid was applied by dip coating onto the surface of the inner protective layer in the above-mentioned magnet body, and then was heated at 150° C. for 20 min, so as to form an outer protective layer, thereby yielding a rare-earth magnet.

When the film structure of thus obtained rare-earth magnet was observed as in Example 1E, it was verified that two layers composed of a layer having an average thickness of 1 μm and a layer having an average thickness of 50 nm were formed as the inner protective layer on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Example 6E

First, as in Example 1E, a magnet body was manufactured, and then an inner protective layer was formed on the surface of the magnet body.

Separately from the above, 20 g of polystyrene having a weight-average molecular weight of 2000 were dissolved in 80 g of tetrahydrofuran, 105 g of phenyltrimethoxysilane and 17.5 of 0.1% aqueous ammonia were added to the resulting solution, and then heat treatment was performed at 50° C. for 5 hr, so as to cause a polycondensation reaction of phenyltrimethoxysilane, thereby preparing a coating liquid. The weight-average molecular weight was a value calculated with reference to an analysis curve using standard polystyrene after measurement by gel permeation chromatography.

Thereafter, this coating liquid was applied by dip coating onto the surface of the inner protective layer in the above-mentioned magnet body, and then was heated at 150° C. for 20 min, so as to form an outer protective layer, thereby yielding a rare-earth magnet.

When the film structure near the surface of thus obtained rare-earth magnet was observed as in Example 1E, it was verified that two layers composed of a layer having an average thickness of 1 μm and a layer having an average thickness of 50 nm were formed as the inner protective layer on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Example 7E

A rare-earth magnet was obtained as in Example 1E except that one further containing talc ($H_2Mg_3O_{12}Si_4$) which was an inorganic additive was used as a material forming the outer protective layer. The compounding amount of talc was such that the content of talc in the outer protective layer was 20 vol %.

Reference Example 1E

As in Example 1E, a magnet body was formed, and then an inner protective layer was formed on the surface of the magnet body, whereby the resulting product was used as a rare-earth magnet of Comparative Example 1E. When thus obtained rare-earth magnet was observed with the transmission electron microscope as in Example 1E, it was verified that two layers composed of a layer having an average thickness of 1 μm and a layer having an average thickness of 50 nm were formed on the surface of the magnet body successively from the magnet body side. When elements contained in these two layers were analyzed by EDS, Nd, Fe, and O were detected as main components from the layer adjacent to the magnet body, whereas no Nd was detected from the layer remote from the magnet body although Fe and O were detected therefrom.

Comparative Example 1E

First, a magnet body was manufactured as in Example 1E. Thereafter, without forming an inner protective layer, a bisphenol-type epoxy resin paint was applied onto the surface of the magnet body, so as to form a protective layer having a thickness of 10 μm, thereby yielding a rare-earth magnet.

Comparative Example 2E

First, as in Example 1E, a magnet body was manufactured, and then an inner protective layer was formed on the surface of the magnet body. Subsequently, a silicone resin paint (SR2410 manufactured by Toray Silicone Co., Ltd.) was applied onto the surface of the inner protective layer, so as to form a protective layer having a thickness of 10 μm, thereby yielding a rare-earth magnet.

Characteristic Evaluation

Salt Spray Test

The rare-earth magnets of Examples 1E to 7E, Reference Example 1E, and Comparative Examples 1E and 2E were subjected to a salt spray test in which 5% brine was sprayed for 96 hr at 35° C. in conformity to JIS K5600-7-1. As a result, no rust was seen to occur in the rare-earth magnets of Examples 1E to 7E and Comparative Examples 1E and 2E but in the rare-earth magnet of Reference Example 1E.

Heat Resistance Test

An immersion test in which the rare-earth magnets of Examples 1E to 7E, Reference Example 1E, and Comparative Examples 1E and 2E were dipped in an ATF (automatic transmission fluid) manufactured by Nippon Oil Corporation at 120° C. for 500 hr was conducted. As a result, the deterioration in magnetic flux after the dipping was 0.05% or less in each of the rare-earth magnets of Examples 1E to 7E and Reference Example 1E, whereas peeling of the outer protective layer occurred in Comparative Examples 1E and 2E, whereby the magnetic flux deteriorated by 3.2% and 2.4%, respectively, after the immersion.

The foregoing results of salt spray test and heat resistance test verified that the rare-earth magnets of Examples 1E to 7E were excellent in both characteristics of the corrosion resistance and heat resistance. By contrast, it was verified that the rare-earth magnet of Reference Example 1E exhibited somewhat low corrosion resistance while being excellent in heat resistance, whereas Comparative Examples 1E and 2E exhibited very low heat resistance while being excellent in corrosion resistance.

The invention claimed is:

1. A rare-earth magnet comprising:
   a magnet body having a constituent material based on R-TB, and
   a protective layer formed on a surface of the magnet body by heat-treating the magnet body in an oxidizing atmosphere containing an oxidizing gas;
   wherein:
   R is a rare-earth element and T is a transition element selected from the group consisting of Fe and a mixture of Fe and Co;
   the protective layer comprises:
   (i) a first oxide layer consisting of a single layer covering the magnet body and containing the rare-earth element, the transition element, and oxygen, and
   (ii) a second oxide layer covering the first oxide layer and containing the transition element, oxygen, and from substantially none of the rare-earth element to an amount of the rare-earth element that is smaller than an amount of the rare-earth element in the first oxide layer;
   the first and second oxide layers do not contain any metal elements that are not contained in the magnet body; and
   the first oxide layer is directly adhered to the magnet body and the second oxide layer is directly adhered to the first oxide layer.

2. The rare-earth magnet according to claim 1, wherein the protective layer is formed by heat-treating the magnet body in an oxidizing atmosphere containing an oxidizing gas while adjusting at least one condition of a partial pressure of the oxidizing gas, a treatment temperature, and a treatment time such as to have the first oxide layer covering the magnet body and containing the rare-earth element, and the second oxide layer covering the first oxide layer and containing the rare-earth element by an amount smaller than that in the first layer.

3. The rare-earth magnet according to claim 1, wherein the protective layer contains oxygen and an element derived from the magnet body.

4. The rare-earth magnet according to claim 1, wherein the rare-earth element is neodymium.

5. The rare-earth magnet according to claim 1, wherein the first and second oxide layers have a total thickness of 0.1 to 20 μm.

6. The rare-earth magnet according to claim 5, wherein the first oxide layer has a thickness greater than a thickness of the second oxide layer, and the thickness of the second oxide layer is greater than 5 nm.

7. The rare-earth magnet according to claim 1, wherein:
   the first and second oxide layers have a total thickness ranging from 0.1 μm to 5 μm,
   the first oxide layer has a thickness greater than a thickness of the second oxide layer, and
   the thickness of the second oxide layer is greater than 5 nm.

8. The rare-earth magnet according to claim 1, wherein the second oxide layer contains substantially none of the rare-earth element.

* * * * *